United States Patent
Kang et al.

(10) Patent No.: US 11,503,567 B2
(45) Date of Patent: Nov. 15, 2022

(54) APPARATUS AND METHOD FOR GRANTING TRANSMISSION RESOURCES FOR DIRECT COMMUNICATION BETWEEN USER EQUIPMENTS IN WIRELESS COMMUNICATION SYSTEM

(71) Applicant: Samsung Electronics Co., Ltd., Suwon-si (KR)

(72) Inventors: Hyunjeong Kang, Suwon-si (KR); Anil Agiwal, Suwon-si (KR); Sangyeob Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 32 days.

(21) Appl. No.: 16/738,418

(22) Filed: Jan. 9, 2020

(65) Prior Publication Data

US 2020/0229145 A1     Jul. 16, 2020

(30) Foreign Application Priority Data

Jan. 10, 2019   (KR) .................. 10-2019-0003286

(51) Int. Cl.
*H04W 72/02* (2009.01)
*H04W 72/04* (2009.01)
*H04W 4/40* (2018.01)
*H04W 92/18* (2009.01)

(52) U.S. Cl.
CPC ............ *H04W 72/02* (2013.01); *H04W 4/40* (2018.02); *H04W 72/042* (2013.01); *H04W 92/18* (2013.01)

(58) Field of Classification Search
None
See application file for complete search history.

(56) References Cited

U.S. PATENT DOCUMENTS

| | | | |
|---|---|---|---|
| 2017/0041902 A1 | 2/2017 | Sheng | |
| 2018/0035278 A1* | 2/2018 | Aminaka | ................ H04W 8/00 |
| 2018/0048994 A1* | 2/2018 | Kwon | ................ H04W 72/02 |
| 2018/0049022 A1* | 2/2018 | Johansson | ............... H04W 8/24 |
| 2018/0115873 A1* | 4/2018 | Aminaka | ............. H04W 92/18 |
| 2018/0332585 A1* | 11/2018 | Faurie | ..................... H04W 4/70 |
| 2018/0368080 A1 | 12/2018 | Chae et al. | |
| 2019/0215828 A1* | 7/2019 | Kim | ...................... H04W 48/08 |
| 2019/0222983 A1* | 7/2019 | Adachi | ............... H04W 72/042 |
| 2019/0223231 A1* | 7/2019 | Muraoka | ............. H04W 92/18 |
| 2019/0246385 A1* | 8/2019 | Lin | ..................... H04W 72/044 |
| 2019/0320475 A1* | 10/2019 | Li | ........................ H04W 72/121 |
| 2020/0029318 A1* | 1/2020 | Guo | ........................ H04L 1/1819 |
| 2020/0053768 A1* | 2/2020 | Chen | .................... H04W 16/10 |
| 2020/0077380 A1* | 3/2020 | Hahn | ...................... H04W 4/46 |

(Continued)

OTHER PUBLICATIONS

Ericsson, 'Resource allocation for Enhanced Mobility', R2-1817955, 3GPP TSG-RAN WG2 #104, Spokane, WA, USA, Nov. 2, 2018 sections 2-3.

(Continued)

*Primary Examiner* — Duc T Duong
(74) *Attorney, Agent, or Firm* — Jefferson IP Law, LLP

(57) ABSTRACT

A method is provided. The method is performed by a user equipment (UE), of performing sidelink communication, and includes obtaining a valid system information block (SIB) for sidelink communication, autonomously determining a sidelink resource based on information of a pool of sidelink resources included in the valid SIB for sidelink communication, and performing sidelink communication with another UE using the determined sidelink resource.

10 Claims, 29 Drawing Sheets

(56) References Cited

U.S. PATENT DOCUMENTS

| | | | |
|---|---|---|---|
| 2020/0077434 A1* | 3/2020 | Kim | H04W 72/14 |
| 2020/0187163 A1* | 6/2020 | Lu | H04W 72/042 |
| 2020/0213976 A1* | 7/2020 | Kim | H04W 76/14 |
| 2020/0260240 A1* | 8/2020 | Lee | H04W 4/48 |
| 2020/0296738 A1* | 9/2020 | Inokuchi | H04W 72/1268 |
| 2020/0374656 A1* | 11/2020 | Alawieh | G01S 5/0268 |
| 2021/0136661 A1* | 5/2021 | Frenger | H04W 48/12 |
| 2021/0185504 A1* | 6/2021 | Wong | H04W 4/06 |
| 2021/0385694 A1* | 12/2021 | Freda | H04W 74/0816 |

OTHER PUBLICATIONS

Oppo, 'Discussion on resource allocation mode for NR-V2X', R2-1816338, 3GPP TSG-RAN WG2 #104, Spokane, WA, USA, Nov. 2, 2018 section 1.

Huawei et al., 'Potential RAN2 impacts on gNB scheduled resource allocation for NR V2X', R2-1816518, 3GPP TSG-RAN WG2 #104, Spokane, WA, USA, Nov. 2, 2018 sections 2-3.

Fraunhofer HHI et al., 'On NR V2X Resource Allocation', R2-1816771, 3GPP TSG-RAN WG2 #104, Spokane, WA, USA, Nov. 1, 2018 sections 2-3.

International Search Report dated Apr. 13, 2020, issued in International Application No. PCT/KR2020/000383.

LG Electronics Inc, NR Sidelink design based on LTE Sidelink, 3GPP TSG-RAN WG2 #103bis, R2-1815441, Oct. 12, 2018, pp. 1-5, XP051524783, Chengdu, China.

Zte et al, Discussion on NR V2X mode 2 alternatives, 3GPP TSG-RAN WG2#104, R2-1816990, Nov. 2, 2018, XP051480921, Spokane, USA.

European Search Report dated Nov. 19, 2021, issued in European Application No. 20738566.7.

* cited by examiner

APPARATUS AND METHOD FOR GRANTING TRANSMISSION RESOURCES FOR DIRECT COMMUNICATION BETWEEN USER EQUIPMENTS IN WIRELESS COMMUNICATION SYSTEM

CROSS-REFERENCE TO RELATED APPLICATION

This application is based on and claims priority under 35 U.S.C. § 119(a) of a Korean patent application number 10-2019-0003286, filed on Jan. 10, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and method for granting radio resources to be used for packet transmission and reception using direct communication between user equipment (UE) in a wireless communication system.

2. Description of the Related Art

To meet the soaring demand with respect to wireless data traffic since commercialization of $4^{th}$-Generation (4G) communication systems, efforts have been made to develop improved $5^{th}$-Generation (5G) communication systems or pre-5G communication systems. For this reason, 5G communication systems or pre-5G communication systems are also called beyond-4G-network communication systems or post-long term evolution (LTE) systems.

It is considered that the 5G communication system will be implemented in millimeter wave (mmWave) bands, e.g., 60 GHz bands, so as to accomplish higher data rates. In 5G communication systems, beamforming, massive multi-input multi-output (MIMO), full dimensional MIMO (FD-MIMO), array antenna, analog beamforming, and large-scale antenna technologies have been discussed as ways of alleviating propagation path loss and increasing propagation distances in ultra-high frequency bands.

In order to improve system networks for 5G communication systems, various technologies have been developed, such as evolved small cell, advanced small cell, cloud radio access network (RAN), ultra-dense network, device to device (D2D) communication, wireless backhaul, moving network, cooperative communication, coordinated multi-points (CoMPs), and interference cancellation.

For 5G systems, other technologies have been developed, such as, hybrid frequency-shift keying (FSK) and quadrature amplitude modulation (QAM) modulation (FQAM) and sliding window superposition coding (SWSC), which are advanced coding modulation (ACM) schemes, and filter bank multi carrier (FBMC), non-orthogonal multiple access (NOMA), and sparse code multiple access (SCMA), which are advanced access schemes.

Various schemes for determining radio resources in 5G systems are also under discussion. For example, a direct communication scheme for vehicle to everything (V2X) user equipment (UE) has been proposed. Moreover, in direct communication between UEs, there have been various discussions about shortening a communication time, improving reliability, and efficiently performing direct communication between UEs.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and method for supporting a vehicle communication service and data transmission, in which required values for high reliability and low latency are achieved by providing a method performed using a direct communication scheme between UEs in a vehicle communication system.

Another aspect of the disclosure, in a next-generation radio access network (ng-RAN) (gNodeB (gNB)) connected to a 5G core network or an evolved universal mobile telecommunication system (UMTS) terrestrial radio access network (E-UTRAN) (ng-evolved NB: ng-eNB) connected to the 5G core network, a UE may perform a V2X service through the ng-RAN or the E-UTRAN.

In accordance with another aspect of the disclosure, when a base station (ng-RAN or ng-eNB) is connected to an evolved packet core network (EPC), the UE may perform the V2X service through the base station. According to another embodiment of the disclosure, when a base station (eNB) is connected to the EPC, the UE may perform the V2X service through the base station. In this case, a V2X wireless interface communication scheme available for direct communication between UEs may include at least one of a unicast scheme, a groupcast scheme, or a broadcast scheme, and the disclosed embodiment provides a method of granting radio resources to be used for V2X transmission and reception in each communication scheme.

Additional aspects will be set forth in part in the description which follows and, in part, will be apparent from the description, or may be learned by practice of the presented embodiments of the disclosure.

In accordance with another aspect of the disclosure, a method, performed by a user equipment (UE), of performing sidelink communication includes obtaining a valid system information block (SIB) for sidelink communication, autonomously determining a sidelink resource based on information of a pool of sidelink resources included in the valid SIB for sidelink communication, and performing sidelink communication with another UE using the determined sidelink resource.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1:
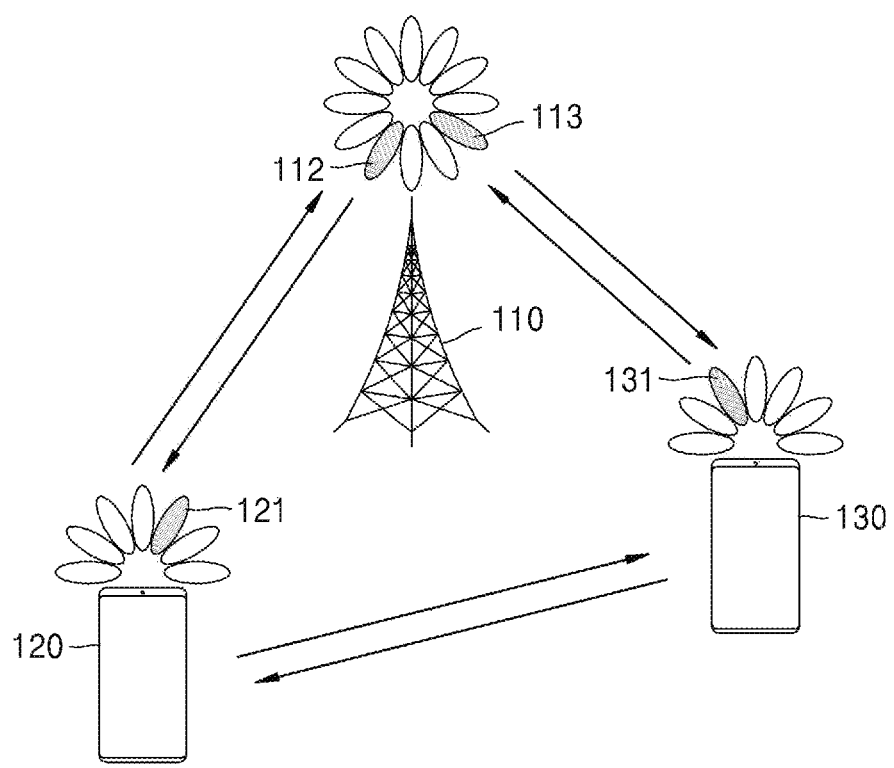
FIG. 1 illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that a singular form of a noun corresponding to an item may include one or more of the things, unless the relevant context clearly indicates otherwise. All of the terms used herein including technical or scientific terms have the same meanings as those generally understood by an ordinary skilled person in the related art. The terms defined in a generally used dictionary should be interpreted as having meanings that are the same as or similar with the contextual meanings of the relevant technology and should not be interpreted as having ideal or exaggerated meanings unless they are clearly defined in the various embodiments of the disclosure. Depending on a case, terms defined in the disclosure cannot be analyzed to exclude the various embodiments of the disclosure.

Throughout the disclosure, the expression "at least one of a, b or c" indicates only a, only b, only c, both a and b, both a and c, both b and c, all of a, b, and c, or variations thereof.

A terminal may include a user equipment (UE), a mobile station (MS), a cellular phone, a smartphone, a computer, or a multimedia system capable of performing communication functions.

In the disclosure, a controller may be referred to as a processor.

In the disclosure, a layer (layer device) may be referred to as an entity.

In various embodiments of the disclosure described below, a hardware-based access method will be described as an example. However, various embodiments of the disclosure include a technique using both hardware and software, such that the various embodiments of the disclosure do not exclude a software-based access method.

The disclosure relates to an apparatus and method for determining radio resources in a wireless communication system. More specifically, the disclosure presents a description of a technique capable of satisfying a quality of service (QoS) level required for various V2X services based on a sidelink radio resource grant method for sidelink direct communication between vehicle-to-everything (V2X) UEs in a wireless communication system.

As used below, a term indicating a signal, a term indicating a channel, a term indicating control information, a term indicating network entities, a term indicating a component of an apparatus, etc., will be presented for convenience of description. However, the disclosure is not limited by the following terms, and other terms having equivalent technical meanings may be used.

Although the disclosure will be described with reference to various embodiments thereof by using terms used in some communication standards (e.g., the $3^{rd}$ Generation Partnership Project: 3GPP), those are merely examples used for description. Various embodiments of the disclosure may be easily modified for application to other communication systems.

FIG. 1 illustrates a wireless communication system according to an embodiment of the disclosure.

Referring to FIG. 1, a base station (BS) 110, a UE 120, and a UE 130 are illustrated as nodes using a wireless channel in a wireless communication system. While FIG. 1 shows one BS 110, another BS that is the same as or similar to the BS 110 may be further included in the wireless communication system. In addition, while FIG. 1 shows two UEs 120 and 130, another UE that is the same as or similar to the UEs 120 and 130 may be further included in the wireless communication system.

The BS 110 may be a network infrastructure that provides the UEs 120 and 130 with a radio access. The BS 110 may have a coverage defined as a geographic region based on a distance in which signal transmission/reception is possible. The BS 110 may be referred to as not only the 'BS', but also an 'access point (AP)', an 'evolved NodeB (eNB)', a '$5^{th}$-generation (5G) node', a '5G NodeB (gNodeB or gNB)', a 'wireless point', a 'transmission/reception point (TRP)', or other terms having technical meanings equivalent thereto.

Each of the UEs 120 and 130 is a device used by a user, and may perform communication with the BS 110 through a wireless channel. Depending on a case, at least one of the UEs 120 and 130 may operate regardless of a user's intervention. That is, at least one of the UEs 120 and 130 may be a device performing machine type communication (MTC), and thus may not be carried by the user. Each of the UEs 120 and 130 may be referred to as not only a 'UE', but also a 'terminal', a 'mobile station (MS)', a 'subscriber station (SS)', a 'remote terminal', a 'wireless terminal', a 'user device', or other terms having technical meanings equivalent thereto.

The BS 110, the UE 120, and the UE 130 may transmit and receive a radio frequency (RF) signal in a sub 6 GHz band and a millimeter wave (mmWave) band (e.g., 28 GHz, 30 GHz, 38 GHz, or 60 GHz). In this case, to improve a channel gain, the BS 110, the UE 120, and the UE 130 may perform beamforming. Beamforming may include transmission beamforming and reception beamforming. That is, the BS 110, the UE 120, and the UE 130 may give directivity to a transmission signal or a reception signal. To this end, the BS 110 and the UEs 120 and 130 may select serving beams 112, 113, 121, and 131 through a beam search procedure or a beam management procedure. After the serving beams 112, 113, 121, and 131 are selected, communication may be performed using resources having a quasi co-location (QLC) relationship with resources used for transmission of the serving beams 112, 113, 121, and 131.

When large-scale properties of a channel carrying a symbol on a first antenna port may be inferred from a channel carrying a symbol on a second antenna port, the first antenna port and the second antenna port may be evaluated as having a QCL relationship with each other. For example, the large-scale properties of the channel may include at least one of delay spread, Doppler spread, a Doppler shift, an average gain, an average delay, or a spatial receiver parameter.

Figure 2:
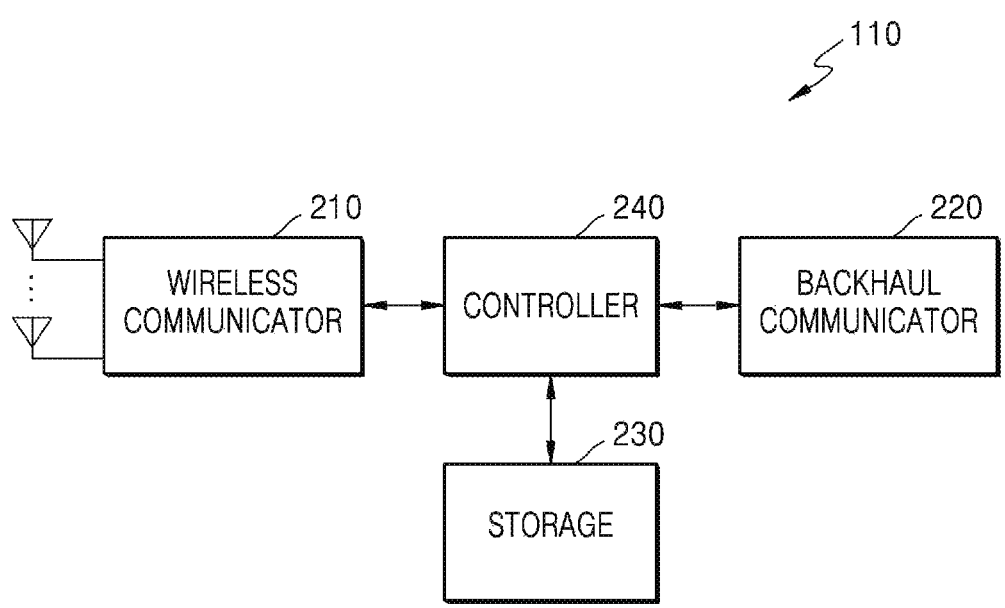
FIG. 2 is a block diagram of a base station in a wireless communication system according to an embodiment of the disclosure.

FIG. 2 is a block diagram of a base station in a wireless communication system according to an embodiment of the disclosure. A configuration illustrated in FIG. 2 may be understood as a configuration of the BS 110. The term used below such as 'unit', 'module', or the like indicates a unit for processing at least one function or operation, and may be implemented in hardware, software, or in a combination of hardware and software.

Referring to FIG. 2, the BS 110 may include a wireless communicator 210, a backhaul communicator 220, a storage 230, and a controller 240.

The wireless communicator 210 may perform functions for transmitting and receiving a signal through a wireless channel. For example, the wireless communicator 210 may perform conversion between a baseband signal and a bitstream according to physical layer standards of a system. In data transmission, the wireless communicator 210 may generate complex symbols by encoding and modulating a transmission bitstream. In data reception, the wireless communicator 210 may recover a received bitstream by demodulating and decoding a baseband signal.

The wireless communicator 210 may also up-convert a baseband signal into a radio frequency (RF) band signal, transmit the RF band signal through an antenna, and down-convert an RF band signal received through the antenna into a baseband signal. To this end, the wireless communicator 210 may include a transmission filter, a reception filter, an amplifier, a mixer, an oscillator, a digital-to-analog converter (DAC), an analog-to-digital converter (ADC), and so forth. The wireless communicator 210 may also include multiple transmission/reception paths. The wireless communicator 210 may further include at least one antenna array including multiple antenna elements.

In terms of hardware, the wireless communicator 210 may include a digital unit and an analog unit, in which the analog unit may include multiple sub-units depending on operating power, operating frequency, etc. The digital unit may be implemented with at least one processor (e.g., a digital processor: DSP).

The wireless communicator 210 may transmit and receive a signal as described above. Thus, the entire wireless communicator 210 or a part thereof may be referred to as a 'transmitter', a 'receiver', or a 'transceiver'. In addition, in the following description, transmission and reception performed through a wireless channel may include a meaning of the above-described processing performed by the wireless communicator 210.

The backhaul communicator 220 may provide an interface for performing communication with other nodes in a network. The backhaul communicator 220 may convert a bitstream transmitted from a BS to another node, e.g., another access node, another BS, a high-layer node, a core network, etc., into a physical signal, and convert a physical signal received from another node into a bitstream.

The storage 230 may store data such as a basic program for operations of the BS 110, an application program, configuration information, and so forth. The storage 230 may include a volatile memory, a non-volatile memory, a combination of the volatile memory and the non-volatile memory, and/or the like. The storage 230 may provide stored data at the request of the controller 240.

The controller 240 may control overall operations of the BS 110. For example, the controller 240 may transmit and receive a signal through the wireless communicator 210 or the backhaul communicator 220. The controller 240 may record and read data from and in the storage 230. The controller 240 may perform functions of a protocol stack required in the communication standards. According to another implementation example, the protocol stack may be included in the wireless communicator 210. To this end, the controller 240 may include at least one processor.

According to various embodiments of the disclosure, the controller 240 may transmit radio resource control (RRC) configuration information to a UE 120 or 130. The controller 240 may transmit sidelink configuration information to the UE 120 or 130. For example, the controller 240 may control the BS 110 to perform operations according to various embodiments of the disclosure described below.

Figure 3:
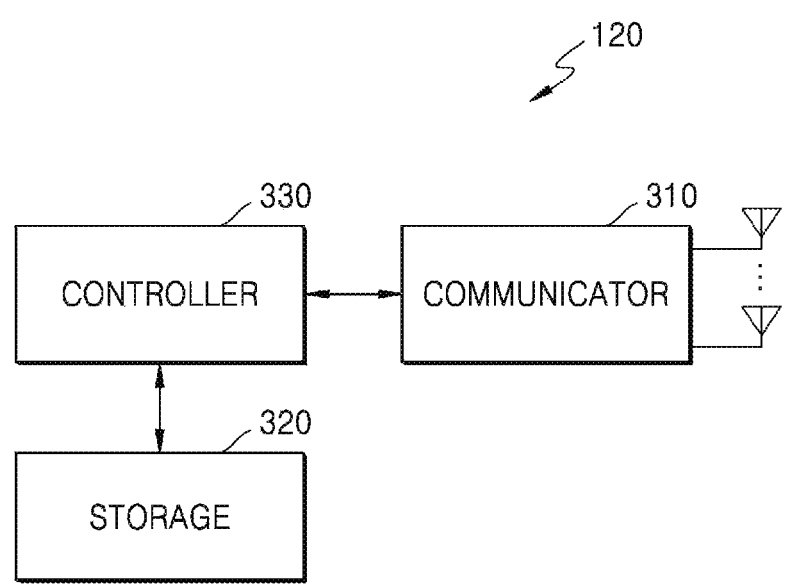
FIG. 3 is a block diagram of a user equipment (UE) in a wireless communication system according to an embodiment of the disclosure.

FIG. 3 is a block diagram of a user equipment (UE) in a wireless communication system according to an embodiment of the disclosure. A configuration illustrated in FIG. 3 may be understood as a configuration of the UE 120 or 130. The term used below such as 'unit', 'module', or the like indicates a unit for processing at least one function or operation, and may be implemented in hardware, software, or in a combination of hardware and software.

Referring to FIG. 3, the UE may include a communicator 310, a storage 320, and a controller 330.

The communicator 310 may perform functions for transmitting and receiving a signal through a wireless channel. For example, the communicator 310 may perform conversion between a baseband signal and a bitstream according to physical layer standards of a system. In data transmission, the communicator 310 may generate complex symbols by encoding and modulating a transmission bitstream. In data reception, the communicator 310 may recover a received bitstream by demodulating and decoding a baseband signal. The communicator 310 may also up-convert a baseband signal into an RF band signal, transmit the RF band signal through an antenna, and down-convert an RF band signal received through the antenna into a baseband signal. The communicator 310 may include a transmission filter, a reception filter, an amplifier, a mixer, an oscillator, a DAC, an ADC, and so forth.

The communicator 310 may also include multiple transmission/reception paths. The communicator 310 may include at least one antenna array including multiple antenna elements. In terms of hardware, the communicator 310 may include a digital circuit and an analog circuit (e.g., a radio frequency integrated circuit: RFIC). Herein, the digital circuit and the analog circuit may be implemented with one package. The communicator 310 may include multiple RF chains. Moreover, the communicator 310 may perform beamforming.

In addition, the communicator 310 may include multiple communication modules for processing signals in different frequency bands. Moreover, the communicator 310 may include multiple communication modules for supporting multiple different RATs. For example, the different RATs may include Bluetooth low energy (BLE), WiFi, WiFi gigabyte (WiGig), a cellular network (e.g., Long Term Evolution (LTE)), etc. The different frequency bands may include a super high frequency (SHF) (e.g., 2.5 GHz, 3.5 GHz, 5 GHz) band, and an mm waves (millimeter wave) (e.g., 60 GHz) band.

The communicator 310 may transmit and receive a signal as described above. Thus, the entire communicator 310 or a part thereof may be referred to as a 'transmitter', a 'receiver', or a 'transceiver'. In addition, in the following description, transmission and reception performed through a wireless channel may include a meaning of the above-described processing performed by the communicator 310.

The storage 320 may store data such as a basic program for operations of the UE, an application program, configuration information, and so forth. The storage 320 may include a volatile memory, a non-volatile memory, a combination of the volatile memory and the non-volatile memory, and/or the like. The storage 320 may provide stored data at the request of the controller 330.

The controller 330 may control overall operations of the UE. For example, the controller 330 may transmit and receive a signal through the communicator 310. The controller 330 may record and read data from and in the storage 320. The controller 330 may perform functions of a protocol stack required in the communication standards. For this, the controller 330 may include at least one processor or microprocessor, or may be implemented as a part of a processor. A part of the communicator 310 and the controller 330 may be referred to as a communication processor (CP).

According to various embodiments of the disclosure, when the UE 120 performs sidelink direct communication with another UE, the UE 120 may perform a process of identifying service information required by a V2X application and determining a V2X transmission mode (unicast, groupcast, or broadcast), a process of determining a sidelink resource grant mode (BS scheduling or UE scheduling) required for V2X packet transmission, a process of determining a sidelink resource grant mode (BS scheduling or UE scheduling) required for hybrid automatic repeat request (HARQ) feedback transmission for a V2X packet, a process of performing sidelink transmission resource or HARQ feedback transmission resource grant in a BS scheduling mode, a process of performing sidelink transmission resource or HARQ feedback transmission resource grant in a UE scheduling mode, a process of performing configured grant-based sidelink resource grant in the UE scheduling mode, a process of performing a scheduling UE operation for performing sidelink resource grant of another UE in the UE scheduling mode, and a process of performing an assistant UE operation for assisting sidelink resource grant of another UE in the UE scheduling mode. For example, the controller 330 may control the UE to perform operations according to various embodiments of the disclosure described below.

Figure 4A:
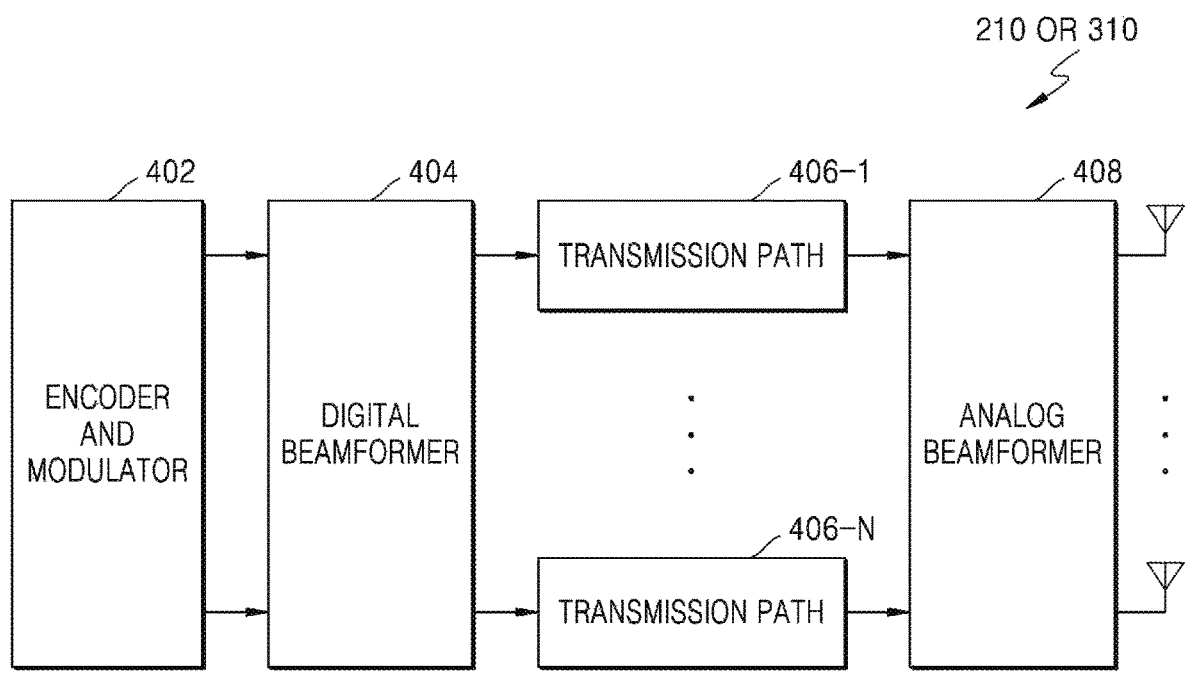
FIG. 4A illustrates a structure of a communicator in a wireless communication system according to an embodiment of the disclosure.
Figure 4B:
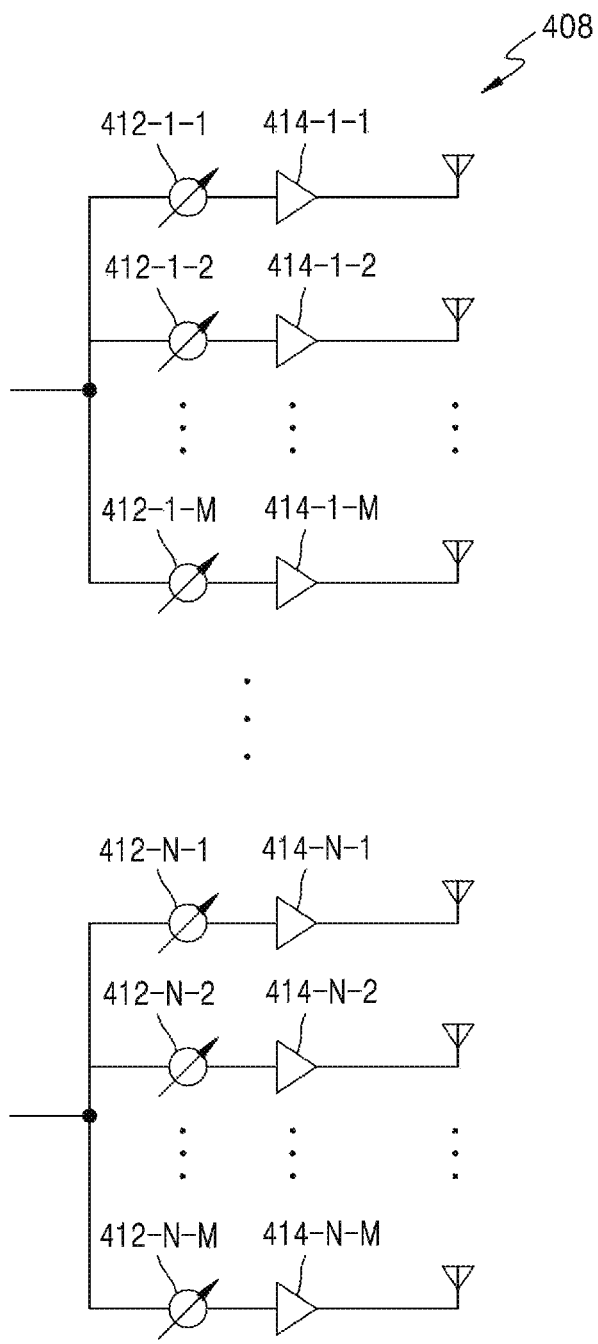
FIG. 4B illustrates another structure of a communicator in a wireless communication system according to an embodiment of the disclosure.
Figure 4C:
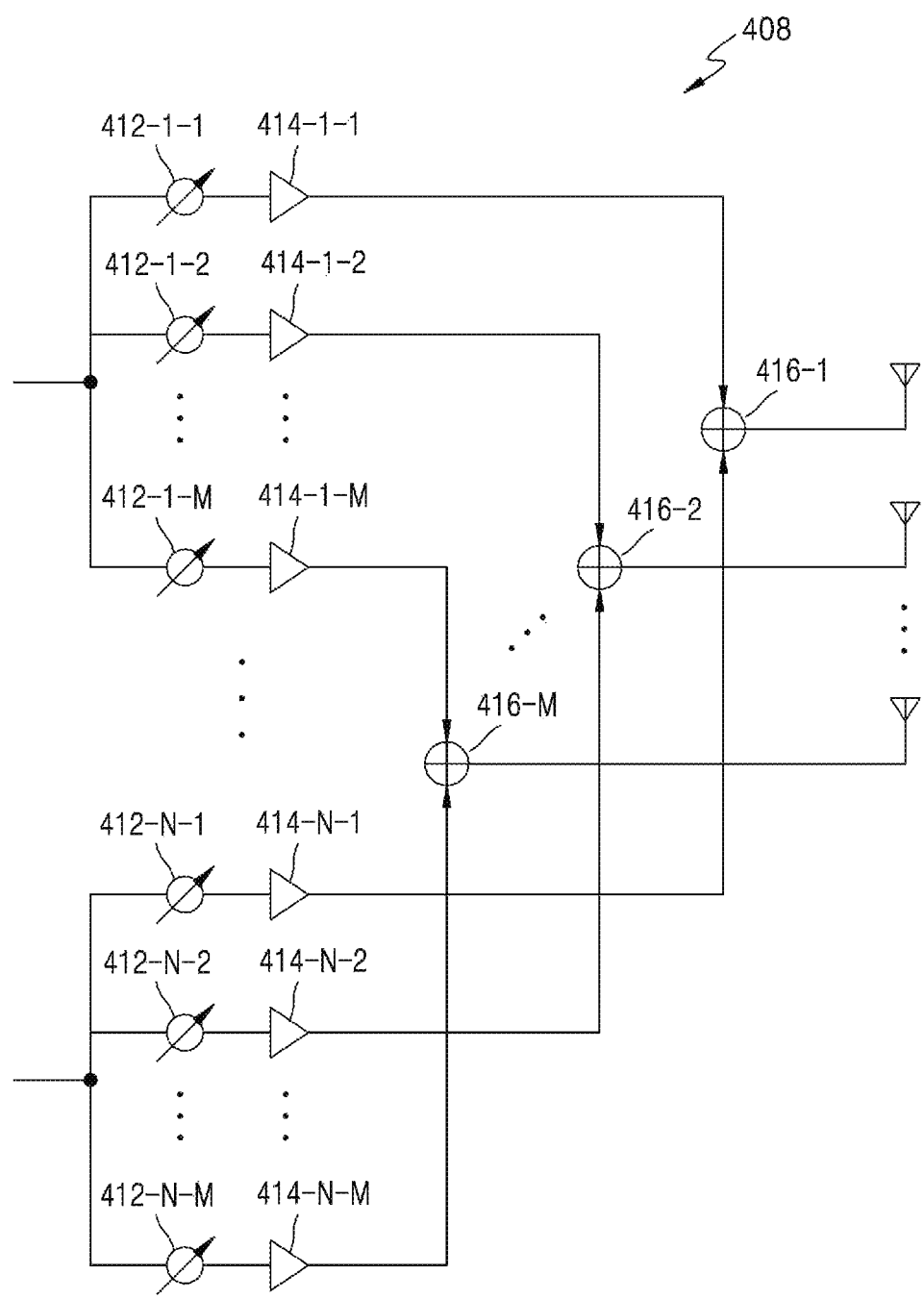
FIG. 4C illustrates another structure of a communicator in a wireless communication system according to an embodiment of the disclosure.

FIGS. 4A through 4C illustrate structures of a communicator in a wireless communication system according to various embodiments of the disclosure. FIGS. 4A through 4C illustrate an example of a detailed structure of the wireless communicator 210 of FIG. 2 or the communicator 310 of FIG. 3. More specifically, FIGS. 4A through 4C illustrate components for performing beamforming, as a part of the wireless communicator 210 of FIG. 2 or the communicator 310 of FIG. 3.

Referring to FIG. 4A, the wireless communicator 210 or the communicator 310 may include an encoder and modulator 402, a digital beamformer 404, multiple transmission paths 406-1 through 406-N, and an analog beamformer 408.

The encoder and modulator 402 may perform channel encoding. For channel encoding, at least one of a low density parity check (LDPC) code, a convolutional code, or a polar code may be used. The encoder and modulator 402 may generate modulation symbols by performing constellation mapping.

The digital beamformer 404 may perform beamforming with respect to a digital signal (e.g., modulation symbols). To this end, the digital beamformer 404 may multiply modulation symbols by beamforming weight values. The beamforming weight values may be used to convert an amplitude and a phase of a signal, and may be referred to as a 'precoding matrix', a 'precoder', etc. The digital beamformer 404 may output the digital-beamformed modulation symbols to the multiple paths 406-1 through 406-N. In this case, according to a multiple-input multiple-output (MIMO) transmission scheme, the modulation symbols may be multiplexed or the same modulation symbols may be provided to the multiple transmission paths 406-1 through 406-N.

The multiple transmission paths 406-1 through 406-N may convert the digital-beamformed digital signals into an analog signal. To this end, each of the multiple transmission paths 406-1 through 406-N may include an inverse fast Fourier transform (IFFT) operator, a cyclic prefix (CP) inserter, a digital-to-analog converter (DAC), and an up-converter. The CP inserter is for an orthogonal frequency division multiplexing (OFDM) scheme, and may be excluded when another physical layer scheme (e.g., filter bank multi-carrier: FBMC) is applied. The multiple transmission paths 406-1 through 406-N may provide an independent signal processing process for multiple streams generated through digital beamforming. However, depending on an implementation scheme, some of the components of the multiple transmission paths 406-1 through 406-N may be used in common.

The analog beamformer 408 may perform beamforming with respect to an analog signal. To this end, the analog beamformer 408 may multiply analog symbols by beamforming weight values. The beamforming weight values may be used to convert an amplitude and a phase of a signal. According to a connection structure between the multiple transmission paths 406-1 through 406-N and antennas, the analog beamformer 408 may be structured as shown in FIG. 4B or 4C.

Referring to FIG. 4B, signals input to the analog beamformer 408 may be transmitted through the antennas, after passing through phase/amplitude conversion and an amplification operation. In this case, a signal of each path may be transmitted through different antenna sets, i.e., antenna arrays. In case of processing of a signal input through the first path, the signal may be converted into a signal sequence having different phases/amplitudes or the same phase/amplitude by phase/amplitude converters 412-1-1 through 412-1-M, may be amplified by amplifiers 414-1-1 through 414-1-M, and may then be transmitted through the antennas.

Referring to FIG. 4C, signals input to the analog beamformer 408 may be transmitted through the antennas, after passing through phase/amplitude conversion and an amplification operation. In this case, a signal of each path may be transmitted through the same antenna set, i.e., the same antenna array. In case of processing of a signal input through the first path, the signal may be converted into a signal sequence having different phases/amplitudes or the same phase/amplitude by the phase/amplitude converters 412-1-1 through 412-N-M, and may be amplified by the amplifiers 414-1-1 through 414-N-M. For transmission through one antenna array, the amplified signals may be summed by summers 416-1 through 416-M based on an antenna element, and may then be transmitted through the antennas.

FIG. 4B illustrates an example in which an independent antenna array is used for each transmission path, and FIG. 4C illustrates an example in which transmission paths share one antenna array. However, the structure of the analog beamformer 408 is not limited to the embodiment shown in FIGS. 4B and 4C, and according to another embodiment of the disclosure, some transmission paths may have an independent antenna array and the other transmission paths may share one antenna array. According to another embodiment of the disclosure, by applying a switchable structure between transmission paths and antenna arrays as the structure of the analog beamformer 408, a structure that is changeable adaptively to a circumstance may be used.

The V2X service may be divided into a basic safety service and an advanced service. The basic safety service may include detailed services such as a vehicle notification (CAM or BSM) service, a left-turn notification service, a forward collision warning system, an emergency vehicle access notification service, a forward obstacle warning service, an intersection signal information service, etc., and V2X information may be transmitted and received using broadcast, unicast, or groupcast transmission. The advanced service reinforces QoS requirements when compared to the basic safety service, and requires a scheme for transmitting and receiving V2X information by using broadcast, unicast, or groupcast transmission to transmit and receive V2X information in a particular vehicle group or between two vehicles. The advanced service may include detailed services such as a platoon driving service, an autonomous driving service, a remote driving service, an extended sensor-based V2X service, etc. According to various embodiments of the disclosure, a description will be made of a scheme to select RAT resources for performing direct communication between vehicles required in the basic safety service or the advanced service, that is, sidelink resources needed for V2X packet transmission and sidelink resources needed for HARQ feedback transmission.

The methods according to the embodiments of the disclosure described in the claims or specification of the disclosure may be implemented by hardware, software, or a combination thereof.

When the methods are implemented by software, a computer-readable storage medium having stored therein one or more programs (software modules) may be provided. The one or more programs stored in the computer-readable storage medium may be configured for execution by one or more processors in an electronic device. The one or more programs include instructions that cause the electronic device to execute the methods according to the embodiments described in the claims or the specification of the disclosure.

These programs (software modules and software) may be stored in random access memories (RAMs), non-volatile memories including flash memories, read only memories (ROMs), electrically erasable programmable ROMs (EEPROMs), magnetic disc storage devices, compact disc-ROMs (CD-ROMs), digital versatile discs (DVDs), other types of optical storage devices, or magnetic cassettes. The programs may be stored in a memory configured by a combination of some or all of such storage devices. Also, each of the memories may be provided in plurality.

The programs may be stored to an attachable storage device of the electronic device accessible via the communication network such as Internet, Intranet, a local area network (LAN), a wide area network (WAN), or storage area network (SAN), or a communication network by combining the networks. The storage device may access a device performing the embodiment of the disclosure through an external port. In addition, a separate storage device on a communication network may access a device performing an embodiment of the disclosure.

In the above-described detailed embodiments of the disclosure, components included in the disclosure have been expressed as singular or plural according to the provided detailed embodiments of the disclosure. However, singular or plural expressions have been selected properly for a condition provided for convenience of a description, and the disclosure is not limited to singular or plural components and components expressed as plural may be configured as a single component or a component expressed as singular may also be configured as plural components.

Figure 5A:
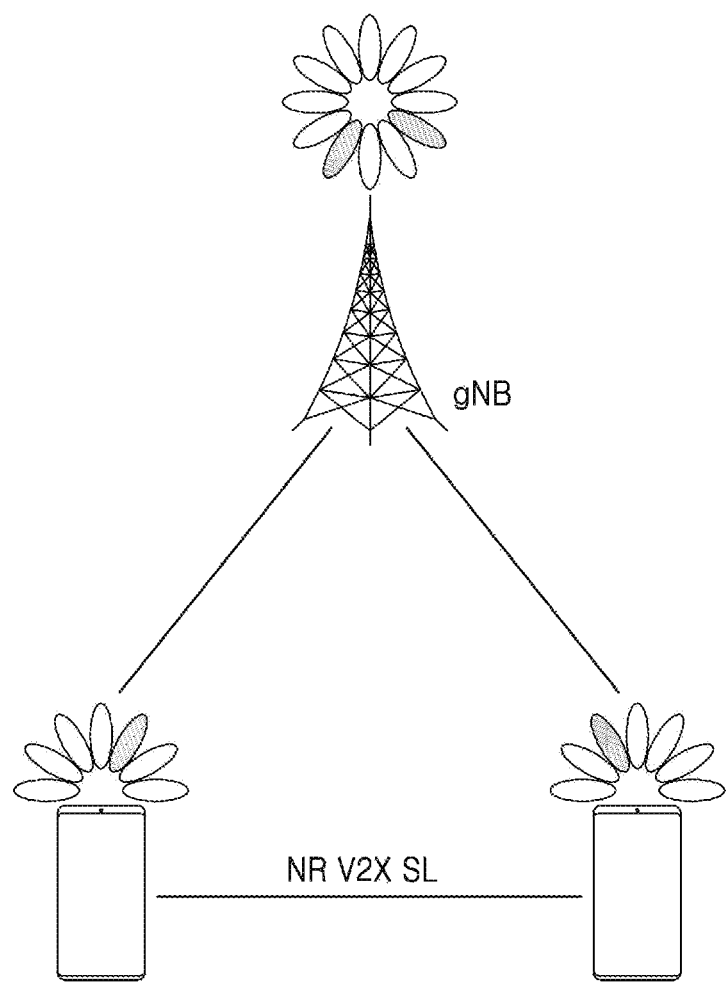
FIG. 5A illustrates a situation where direct communication between UEs is performed using sidelink radio access technology (RAT), according to an embodiment of the disclosure.
Figure 5B:
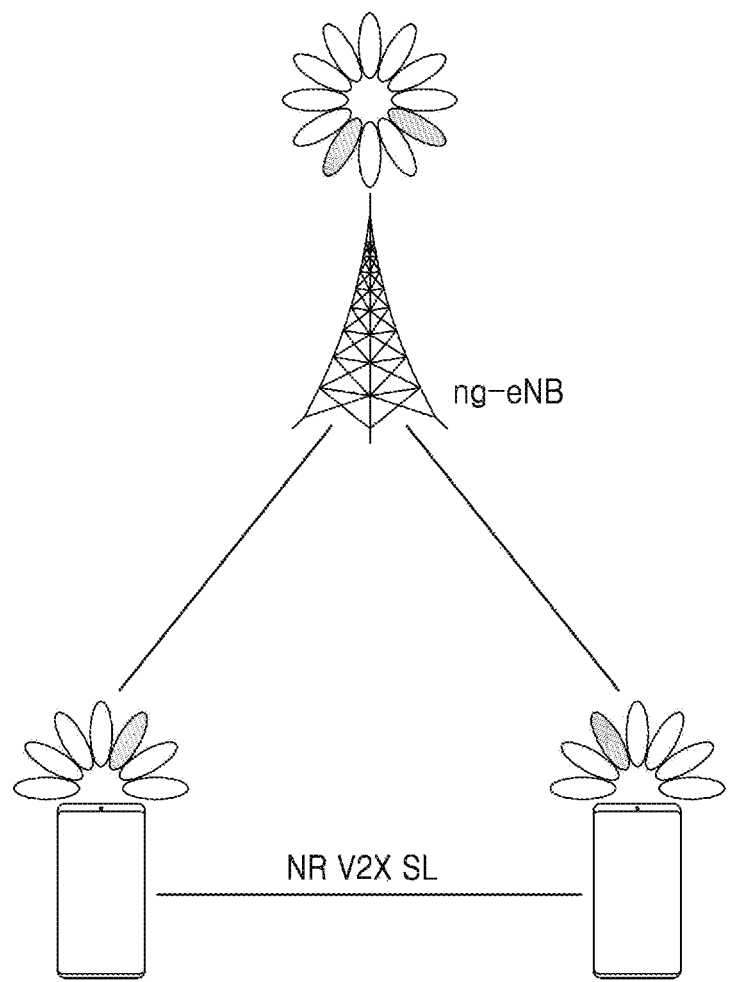
FIG. 5B illustrates another situation where direct communication between UEs is performed using sidelink radio access technology (RAT), according to an embodiment of the disclosure.
Figure 5C:
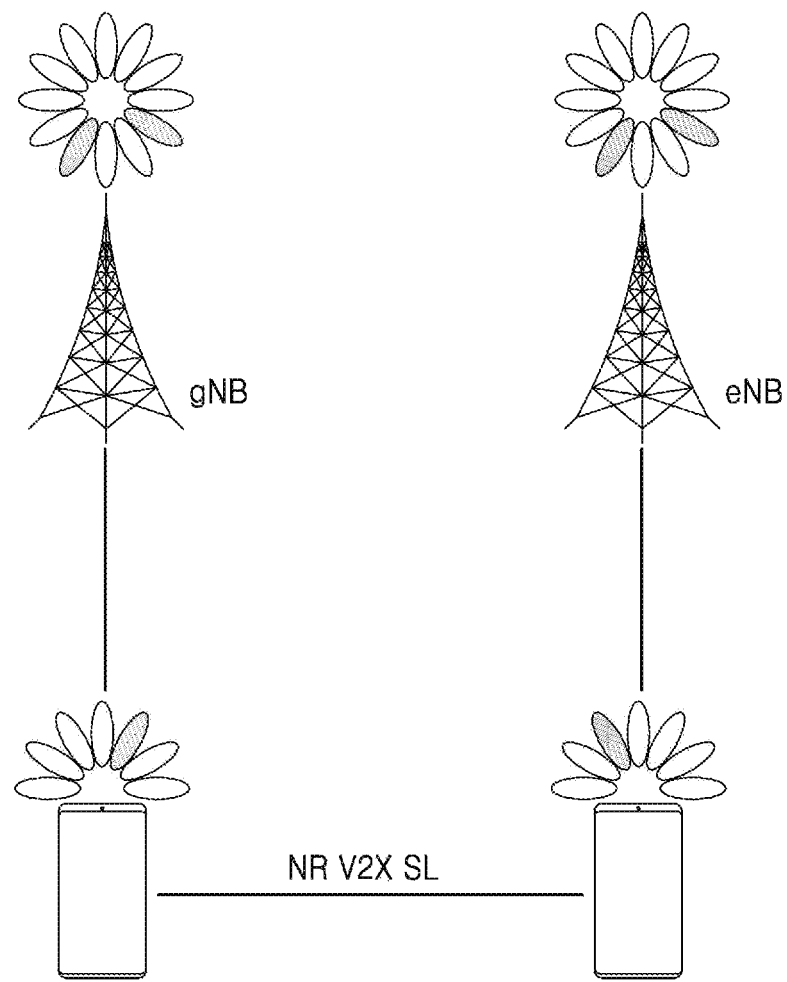
FIG. 5C illustrates another situation where direct communication between UEs is performed using sidelink radio access technology (RAT), according to an embodiment of the disclosure.

FIGS. 5A through 5C illustrate a situation where direct communication between UEs is performed using sidelink radio access technology (RAT), according to various embodiments of the disclosure.

FIG. 5A illustrates a scenario in which UEs in a gNB coverage perform direct communication.

Referring to FIG. 5A, sidelink resource pool (transmission/reception pool) information to be used for unicast-based V2X packet transmission/reception between the UEs in the gNB coverage may be transmitted through a system information message or RRC dedicated message of a gNB or may be pre-configured. In addition to the sidelink resource pool to be used for unicast-based V2X packet transmission and reception between the UEs, a sidelink resource pool to be used for HARQ feedback transmission may be separately configured or may be configured identically to the V2X packet transmission/reception pool.

Referring to FIG. 5A, sidelink resource pool (transmission/reception pool) information to be used for broadcast-based V2X packet transmission/reception may be transmitted through the system information message or RRC dedicated message of the gNB or may be pre-configured.

FIG. 5B illustrates a scenario in which UEs in a ng-eNB coverage perform direct communication.

Referring to FIG. 5B, sidelink resource pool (transmission/reception pool) information to be used for unicast-based V2X packet transmission/reception between the UEs in the ng-eNB coverage may be transmitted through a system information message or RRC dedicated message of an ng-eNB or may be pre-configured. In addition to the sidelink resource pool to be used for unicast-based V2X packet transmission and reception between the UEs, a sidelink resource pool to be used for HARQ feedback transmission may be separately configured or may be configured identically to the V2X packet transmission/reception pool.

Referring to FIG. 5B, sidelink resource pool (transmission/reception pool) information to be used for broadcast-based V2X packet transmission/reception may be transmitted through the system information message or RRC dedicated message of the ng-eNB or may be pre-configured.

FIG. 5C illustrates a scenario in which a UE in a gNB coverage and a UE in an eNB coverage perform direct communication. Sidelink resource pool (transmission/reception pool) information to be used for unicast-based V2X packet transmission/reception between the UE in the gNB coverage and the UE in the eNB coverage may be transmitted through a system information message or RRC dedicated message of an ng-eNB or may be pre-configured. In addition to the sidelink resource pool to be used for unicast-based V2X packet transmission and reception between the UE in the gNB coverage and the UE in the eNB coverage, a sidelink resource pool to be used for HARQ feedback transmission may be separately configured or may be configured identically to the V2X packet transmission/reception pool.

Referring to FIG. 5C, sidelink resource pool (transmission/reception pool) information to be used for broadcast-based V2X packet transmission/reception may be transmitted through the system information message or RRC dedicated message of the gNB or may be pre-configured.

In a sidelink resource grant scheme according to an embodiment of the disclosure, in a scheduling mode where a UE located in the gNB coverage plays a role of a scheduling UE or an assistant UE, the UE may be located in the gNB coverage and obtain sidelink pool information (which may include an HARQ feedback resource according to an embodiment of the disclosure) or pre-configured sidelink resource pool information, and play a role of a scheduling UE or an assistant UE by using the obtained pool information. In a sidelink resource grant scheme according to another embodiment of the disclosure, in a scheduling mode where a UE located in the eNB coverage plays a role of a scheduling UE or an assistant UE, the UE may be located in the eNB coverage and obtain pre-configured sidelink resource pool information and play a role of a scheduling UE or an assistant UE by using the obtained pool information.

Figure 5D:
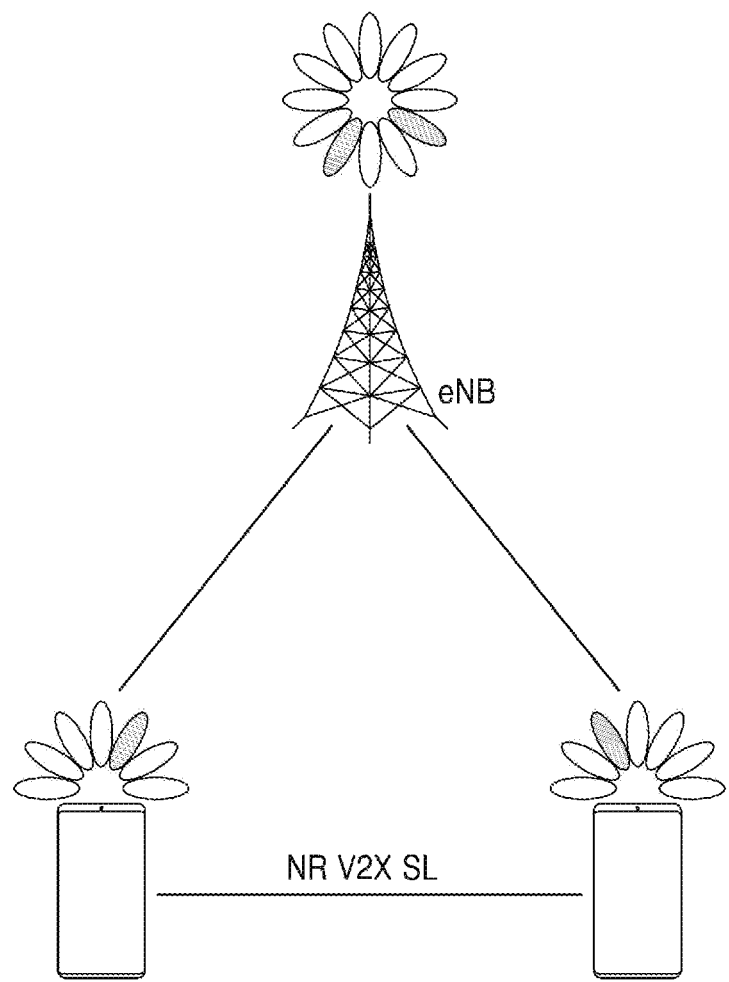
FIG. 5D illustrates another situation where direct communication between UEs is performed using sidelink radio access technology (RAT), according to an embodiment of the disclosure.

FIG. 5D illustrates a scenario in which UEs in an eNB coverage perform direct communication. Sidelink resource pool (transmission/reception pool) information to be used for unicast-based V2X packet transmission/reception between the UEs in the eNB coverage may be pre-configured. In addition to the sidelink resource pool to be used for unicast-based V2X packet transmission and reception between the UEs in the eNB coverage, a sidelink resource pool to be used for HARQ feedback transmission may be separately configured or may be configured identically to the V2X packet transmission/reception pool.

Referring to FIG. 5D, sidelink resource pool (transmission/reception pool) information to be used for broadcast-based V2X packet transmission/reception may be pre-configured. In a sidelink resource grant scheme according to an embodiment of the disclosure, in a scheduling mode where a UE located in the eNB coverage plays a role of a scheduling UE or an assistant UE, the UE obtain pre-configured sidelink resource pool information and play a role of a scheduling UE or an assistant UE by using the obtained pool information.

In FIGS. 5A through 5D, a broadcast pool and a unicast pool may be configured as the same pool or different pools.

According to an embodiment of the disclosure, a criterion for configuring the broadcast pool and the unicast pool as the same pool or separate pools may be, for example, a case where a congestion ratio of a pool exceeds a threshold. A V2X server or a BS may manage a threshold for a congestion ratio of a pool corresponding to each V2X service and provide the V2X service, and when the congestion ratio of the pool exceeds the threshold, the broadcast and the unicast may be managed in the separate pools.

According to various embodiments of the disclosure, a method for sidelink resource grant for direct communication between UEs may be used for unicast-based V2X message transmission/reception and broadcast-based V2X message transmission/reception. According to various embodiments of the disclosure, a method for sidelink resource grant for direct communication between UEs may include a mode in which a BS directly grants a resource and a mode in which a UE directly selects a resource.

According to various embodiments of the disclosure, for unicast-based V2X packet transmission/reception, a reception UE may transmit an HARQ feedback with respect to a V2X packet. When a UE is located in the gNB coverage or the ng-eNB coverage, the UE may transmit a request for a sidelink resource for transmitting the HARQ feedback to the gNB or the ng-eNB. The UE transmitting the request for the sidelink resource for transmitting the HARQ feedback may include at least one of a UE transmitting a unicast-based V2X packet, a UE having received a unicast-based V2X packet, a scheduling UE, or an assistant UE. Signaling used by the UE to transmit a request for resources needed for HARQ feedback transmission may include at least one of an RRC dedicated message (SidelinkUEInformation or UEAssitanceInformation) or MAC control signaling (HARQ feedback resource request MAC CE). The gNB or the ng-eNB having received the request may provide HARQ feedback transmission resource information to the UE through an RRC dedicated message (RRCConnectionReconfiguration). The HARQ feedback transmission resource information provided by the gNB or the ng-eNB may include at least one of a (mode1-based) HARQ feedback transmission resource to be scheduled directly by the gNB or the ng-eNB or a (mode2-based) HARQ feedback transmission resource to be selected by the UE. A procedure for granting a sidelink resource for HARQ feedback transmission will be described in detail with reference to FIGS. 6 through 10.

FIGS. 6A through 6E illustrate a signal procedure in a sidelink resource grant mode 1 for direct communication between UEs, according to various embodiments of the disclosure.

Figure 6A:
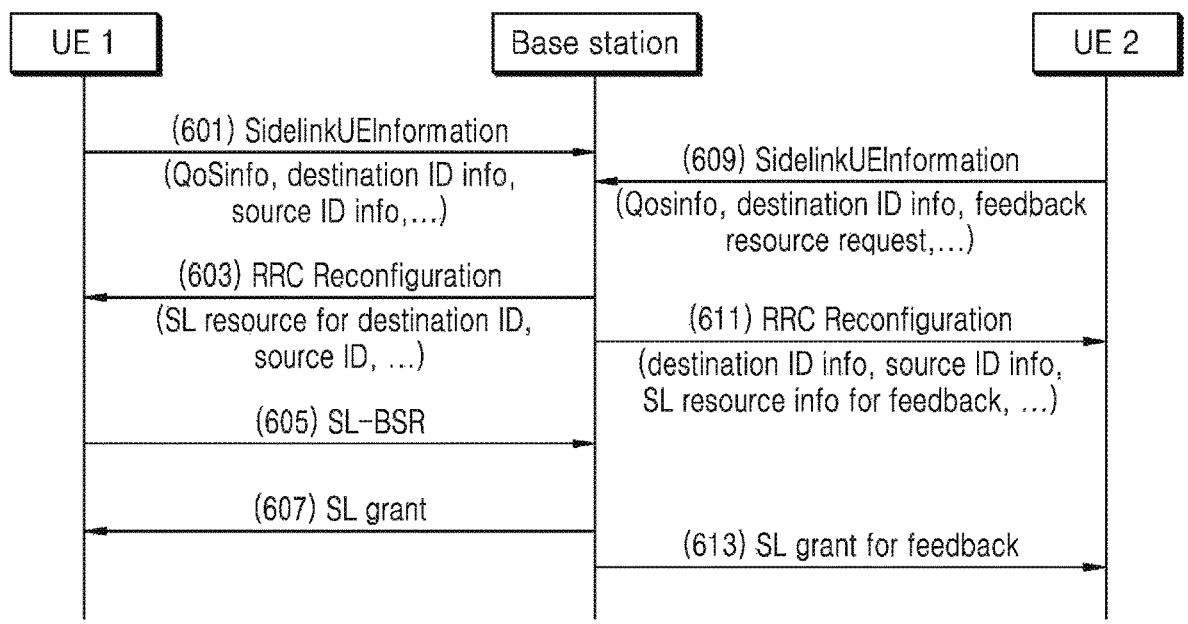
FIG. 6A illustrates a signal procedure in a sidelink resource grant mode 1 for direct communication between UEs, according to an embodiment of the disclosure.
Figure 6B:
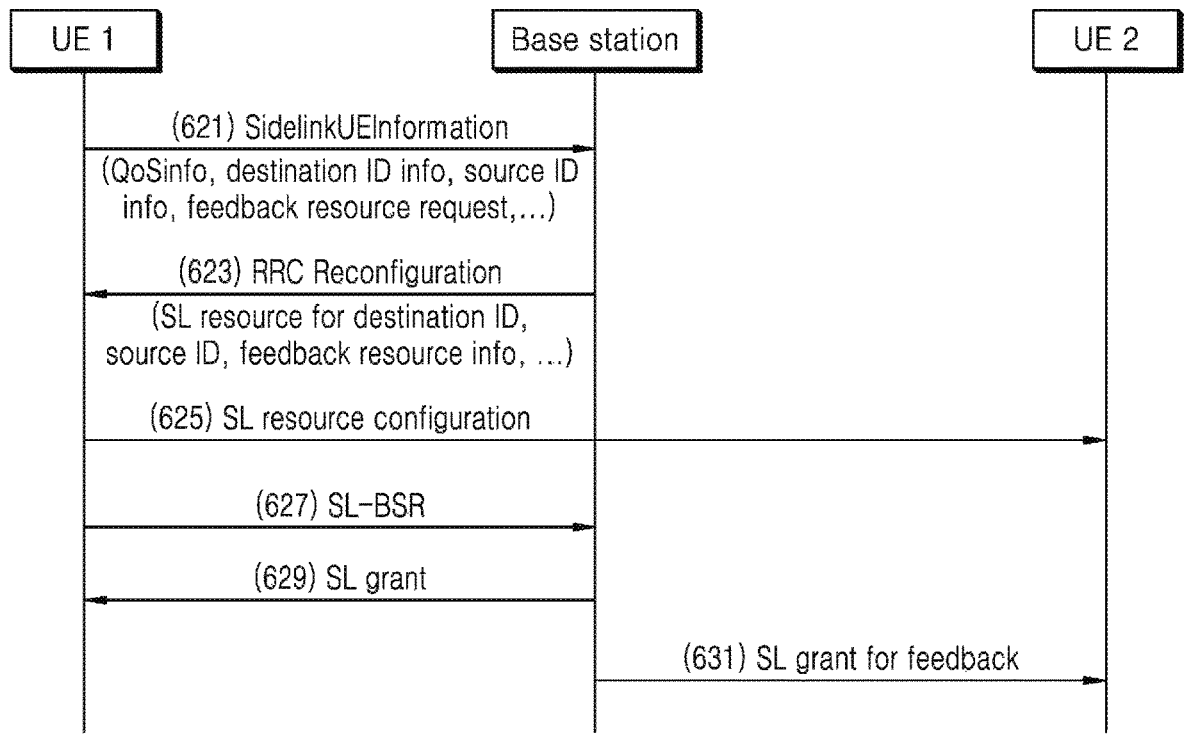
FIG. 6B illustrates another signal procedure in a sidelink resource grant mode 1 for direct communication between UEs, according to an embodiment of the disclosure.
Figure 6C:
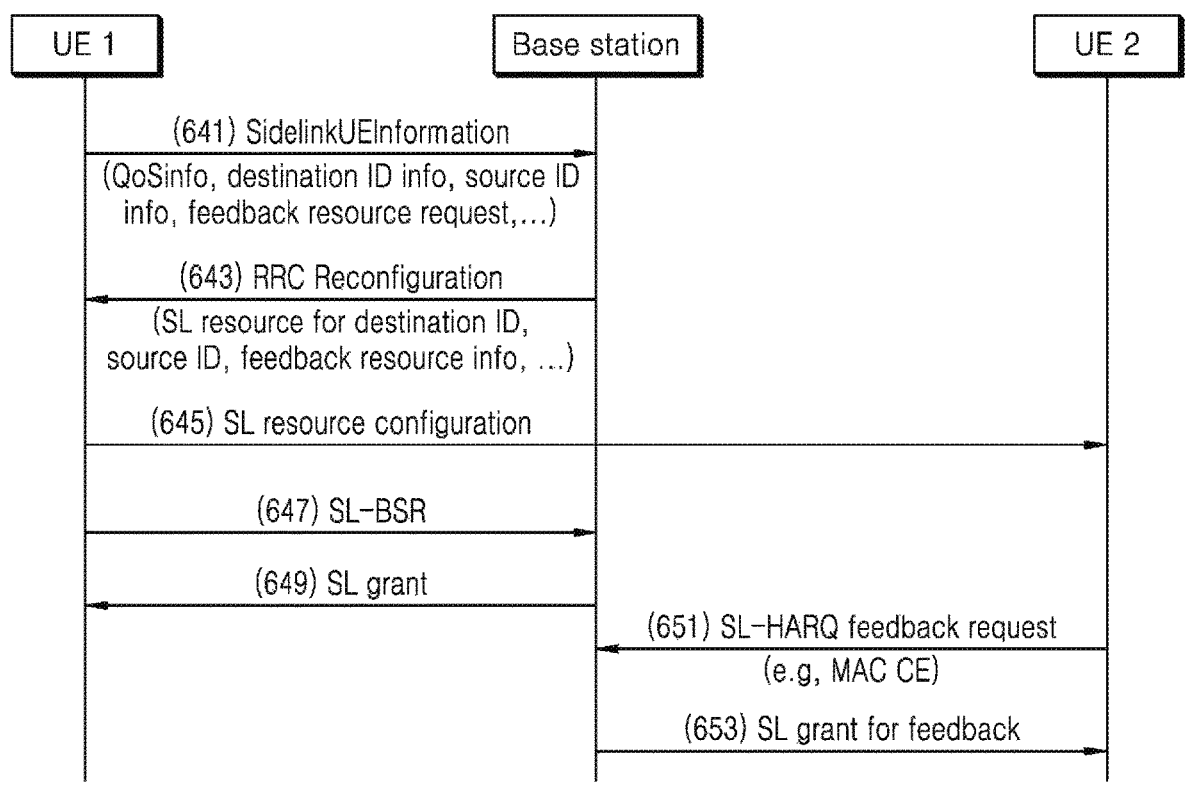
FIG. 6C illustrates another signal procedure in a sidelink resource grant mode 1 for direct communication between UEs, according to an embodiment of the disclosure.

FIGS. 6A through 6C illustrate a procedure using SidelinkUEInformation signaling exchange according to various embodiments of the disclosure. In case that the UE transmits a SidelinkUEInformation message to the BS to request sidelink (SL) resources (including a V2X packet and an HARQ feedback), this case may include a case where the UE receives a System information message (e.g., sibTypeV2X) including information indicating that the BS supports a V2X sidelink function. In an embodiment of FIGS. 6A through 6C, it may be assumed that UE1 is a transmission (TX) UE and UE2 is a reception (RX) UE. When unicast-based V2X packet transmission/reception is performed, the RX UE may transmit an HARQ feedback with respect to a V2X packet.

Referring to FIG. 6A, according to an embodiment of the disclosure, in operation 601, UE1 may transmit a SidelinkUEInformation message including information needed to request an SL resource necessary for V2X packet transmission to a BS. In operation 603, the BS may configure a sidelink transmission resource or SL resource to be used by UE1 for direct communication, based on information of UE1, and transmit an RRCConnectionReconfiguration message including the configured sidelink transmission resource to UE1. According to sidelink transmission resource grant information included in the RRCConnectionReconfiguration message received by the UE in operation 603, when a sidelink resource grant mode for direct communication between UEs is determined as mode1 where the BS directly schedules a sidelink resource and the UE is configured to request dynamic grant, then UE1 may transmit SL-BSR signaling to the BS to be dynamically granted with the sidelink transmission resource, in operation 605. In operation 607, the BS may dynamically grant the sidelink resource to be used for V2X packet transmission by UE1, based on information of SL-BSR signaling transmitted by UE1.

In an embodiment of the disclosure where UE1 and UE2 transmit and receive a V2X packet in the unicast manner, UE2 may transmit an HARQ feedback with respect to the V2X packet transmitted by UE1. In operation 609, to be granted with a sidelink resource for HARQ feedback transmission, UE2 may transmit a SidelinkUEInformation message including information needed for HARQ feedback transmission resource grant to the BS. In operation 611, the BS may configure a sidelink transmission resource to be used by UE2 for HARQ feedback transmission, based on information of UE2, and transmit an RRCConnectionReconfiguration message including the configured sidelink transmission resource to UE2. When the BS determines to directly schedule an HARQ feedback transmission resource according to sidelink resource grant information used for the HARQ feedback, included in the RRCConnectionReconfiguration message received in operation 611, then UE2 may be granted with a sidelink resource to be used for HARQ feedback transmission from the BS in operation 613.

Referring to FIG. 6B, according to an embodiment of the disclosure, in operation 621, UE1 may transmit a SidelinkUEInformation message including information needed to request a sidelink resource necessary for V2X packet transmission to the BS. In operation 623, the BS may configure a sidelink transmission resource to be used by UE1 for direct communication, based on information of UE1, and transmit an RRCConnectionReconfiguration message including the configured sidelink transmission resource to UE1. According to sidelink transmission resource grant information included in the RRCConnectionReconfiguration message received in operation 623, when a sidelink resource grant mode for direct communication between UEs is determined as mode1 where the BS directly schedules a sidelink resource and the UE is configured to request dynamic grant, then UE1 may transmit SL-BSR signaling to the BS to be dynamically granted with the sidelink transmission resource, in operation 627. In operation 629, the BS may dynamically grant the sidelink resource to be used for V2X packet transmission by UE1, based on information of SL-BSR signaling transmitted by UE1.

In an embodiment of the disclosure where UE1 and UE2 transmit and receive a V2X packet in the unicast manner, UE1 may transmit a request for grant of a sidelink resource needed by UE2 to transmit an HARQ feedback with respect to the V2X packet received by UE2. UE1 may transmit to the BS, information required for HARQ feedback transmission resource grant of UE2 through the SidelinkUEInformation message transmitted to be granted with the sidelink resource for HARQ feedback transmission in operation 621. In operation 623, the BS may configure the sidelink transmission resource for HARQ feedback transmission of UE2 and transmit the RRCConnectionReconfiguration message including sidelink transmission resource configuration information for the HARQ feedback to UE1. In operation 625, UE1 may deliver the sidelink transmission resource configuration information for the HARQ feedback to UE2. An SL resource configuration message delivered from UE1 to UE2 in operation 625 may also include sidelink transmission resource configuration information to be used by UE1 for V2X packet transmission. When the BS determines to directly schedule an HARQ feedback transmission resource according to sidelink resource grant information used for the HARQ feedback, included in the RRCConnectionReconfiguration message received in operation 623, then UE2 may be granted with a sidelink resource to be used for HARQ feedback transmission from the BS in operation 631.

Referring to FIG. 6C, according to an embodiment of the disclosure, in operation 641, UE1 may transmit a SidelinkUEInformation message including information needed to request an SL resource necessary for V2X packet transmission to the BS. In operation 643, the BS may configure a sidelink transmission resource to be used by UE1 for direct communication, based on information of UE1, and transmit an RRCConnectionReconfiguration message including the configured sidelink transmission resource to UE1. According to sidelink transmission resource grant information included in the RRCConnectionReconfiguration message received in operation 643, when a sidelink resource grant mode for direct communication between UEs is determined as mode1 where the BS directly schedules a sidelink resource and the UE is configured to request dynamic grant, then UE1 may transmit SL-BSR signaling to the BS to be dynamically granted with the sidelink transmission resource, in operation 647. In operation 649, the BS may dynamically grant the sidelink resource to be used for V2X packet transmission by UE1, based on information of SL-BSR signaling transmitted by UE1.

In an embodiment of the disclosure where UE1 and UE2 transmit and receive a V2X packet in the unicast manner, UE1 may transmit a request for sidelink resource information needed by UE2 to the BS to transmit an HARQ feedback with respect to the V2X packet received by UE2. UE1 may transmit to the BS, information required for HARQ feedback transmission resource grant of UE2 through the SidelinkUEInformation message transmitted to be granted with the sidelink resource information for HARQ feedback transmission in operation 641. In operation 643, the BS may configure the sidelink transmission resource for HARQ feedback transmission of UE2 and transmit the RRCConnectionReconfiguration message including sidelink transmission resource configuration information for the HARQ feedback to UE1. In operation 645, UE1 may deliver the sidelink transmission resource configuration information for the HARQ feedback to UE2. An SL resource configuration message delivered from UE1 to UE2 in operation 645 may also include sidelink transmission resource configuration information to be used by UE1 for V2X packet transmission. When the BS determines to directly schedule an HARQ feedback transmission resource according to sidelink resource grant information used for the HARQ feedback, included in the RRCConnectionReconfiguration message received in operation 643, then UE2 may transmit SL-HARQ feedback request signaling to the BS to be granted with a sidelink resource for the HARQ feedback in operation 651. In operation 653, the BS may grant the sidelink resource to be used by UE2 for HARQ feedback transmission to UE2 based on received SL-HARQ feedback request signaling information. The SL-HARQ feedback request signaling may include at least one of a designation identification (ID), a source ID, a unicast session ID, or an SL configured grant ID.

In the above-described embodiment of FIGS. 6A through 6C, the SidelinkUEInformation message transmitted by the UE to request a sidelink transmission resource may include at least one of the following parameters:

at least one of use case indicator, service ID, destination ID, source ID, group ID, unicast information, QoS indicator, UE's RAT capability, service flow ID, bearer ID, 5QI, PPPP, PPPR, or HARQ feedback information; and at least one of HARQ feedback information that is a parameter used for a BS to grant a sidelink transmission resource for HARQ feedback of an RX UE, such as UE's HARQ feedback transmission capability (e.g., HARQ timing (a time required for UE until HARQ feedback transmission after V2X packet reception)), RF capability, or antenna capability.

```
SidelinkUEInformation ::= SEQUENCE {
    v2x-CommRxInterestedFreqList    SL-V2X-CommFreqList,
    p2x-CommTxType-r14              ENUMERATED {true},
    v2x-CommTxResourceReq           SL-V2X-CommTxFreqList,
    carrierFreq                     ARFCN-Value,
    priorityInfoListSL              PPPP_information,
    reliabilityInfoListSL           PPPR_information,
    QoSInfoListSL                   5QI_information,
    serviceInfoListSL               DST_ID, //·service·ID,·flow·ID,·bearer·ID
    groupInfoListSL                 group_information, //group·ID
    unicastInfoListSL               unicast_information, //unicast•session·ID
    destinationID                   destination_ID,
    sourceID                        source_ID,
    sl_harqfeedbackInfo             HARQ_feedback_information,
    ...
}
```

In the above-described embodiment of FIGS. 6A through 6C, information included in the RRCConnectionReconfiguration message used for delivery of sidelink RAT configuration information to the UE may include at least one of the following parameters:

at least one of Destination ID, source ID, group information, unicast session information, sidelink V2X packet transmission resource information, or sidelink HARQ feedback transmission resource information.

```
RRCConnectionReconfiguration message
SL-CommRATListV2X ::= SEQUENCE {
    trafficDestination•DST_ID, //·service·ID,·flow·ID,·bearer·ID
    groupInfoListSL   group_information, //·group·ID
    unicastInfoListSL unicast_information,  //unicast·session·ID
    sourceID      source_ID,
    sl_V2X_ResourceConfigInfo  SL-V2X-ConfigDedicated, //sielink•
    resource·pool·(V2X·packet·or·HARQ·feedback)
    ...
}
```

According to an embodiment of the disclosure, sidelink resource grant information transmitted through RRC dedicated signaling may be as below.

```
SL-V2X-ConfigDedicated ::=           SEQUENCE  {
    commTxResources                  CHOICE {     //for V2X packet
        release   NULL,
        setup CHOICE {
            scheduled                SEQUENCE {
                sl-V-RNTI                C-RNTI,
                mac-MainConfig           MAC-MainConfigSL,
                v2x-SchedulingPool           SL-CommResourcePoolV2X
OPTIONAL,   --Need-ON
                mcs                      INTEGER (0..31)    OPTIONAL,  --
Need-OR
                logicalChGroupInfoList            LogicalChGroupInfoList
            },
            ue-Selected SEQUENCE {
                v2x-CommTxPoolNormalDedicated SEQUENCE {
                    poolToReleaseList SL-TxPoolToReleaseListV2X
OPTIONAL,   --Need-ON
                    poolToAddModList  SL-TxPoolToAddModListV2X
OPTIONAL,   --Need-ON
                    v2x-CommTxPoolSensingConfig
SL-CommTxPoolSensingConfig                        OTIONAL   --Need-ON
                }
            }
        }
    }
}
```

According to an embodiment of the disclosure, sidelink HARQ feedback resource grant information transmitted through RRC dedicated signaling may be as below.

```
SL-V2X-ConfigDedicated ::=       SEQUENCE {
    commTxFeedbackResourcesCHOICE {  //for HARQ feedback resource
        release   NULL,
        setup CHOICE {
            scheduled   SEQUENCE {
                sl-V-Feedback-RNTI     C-RNTI,//SL HARQ feedback
Resource Granted UE ID
                v2x-SchedulingPool          SL-CommResourcePoolV2X
OPTIONAL,   --Need-On
                logicalChGroupInfoList            LogicalChGroupInfoList
            },
            ue-Selected SEQUENCE {
                v2x-CommTxPoolNormalDedicated SEQUENCE {
                    poolToReleaseList SL-TxPoolToReleaseListV2X
OPTIONAL,   --Need-On
                    poolToAddModList SL-TxPoolToAddModListV2X
OPTIONAL,   --Need-On
                    v2x-CommTxPoolSensingConfig
SL-CommTxPoolSensingConfig  OPTIONAL   --Need-ON
                }
            }
        }
    }
}
```

According to an embodiment of the disclosure, the SL resource configuration message used to deliver sidelink resource configuration information for HARQ feedback transmission between UEs may include at least one parameter included in commTxFeedbackResources. According to an embodiment of the disclosure, the SL resource configuration message may include at least one parameter included in commTxResources.

When the UE is not located in a BS coverage, the UE may select an HARQ feedback transmission resource from a pre-configured resource. The pre-configured resource may be a pre-configured resource for the HARQ feedback or for the sidelink V2X packet and the HARQ packet.

In FIGS. 6A through 6C, an SR resource for SL-BSR may have a configuration that is different from a resource for transmitting an uplink BSR. SR resource configuration information for transmitting SL-BSR may include at least one of SR resource ID, SR ID, Periodicity, offset, or PUCCH resource ID. The SR resource configuration information for transmitting SL-BSR may be differently managed according to service information of a sidelink V2X packet, QoS information, or priority information. The SR resource configuration information may be used mapped to an SL logical channel that may have a mapped QoS or priority.

According to an embodiment of the disclosure, a configuration of the SL logical channel may be as below.

```
....
    SLLogicalChannelConfig ::= SEQUENCE {
        sl-SpecificParameters    SEQUENCE {
            priority             INTEGER (1..16),
            prioritisedBitRate   ENUMERATED {kBps0, kBps8, kBps16,
kBps32, kBps64, kBps128, kBps256, kBps512, kBps1024, kBps2048, kBps4096,
kBps8192, kBps16384, kBps32768, kBps65536, infinity},
            bucketSizeDuration   ENUMERATED {ms5, ms10, ms20, ms50, ms100,
ms150, ms300, ms500, ms1000, spare7, spare6, spare5, spare4, spare3, spare2,
spare1},
            allowedServingCells  SEQUENCE (SIZE
(1..maxNrofServingCells-1)) OF ServCellIndex    OPTIONAL,
PDCP-CADuplication
            allowedSCS-List SEQUENCE (SIZE (1..maxSCSs)) OF
SubcarrierSpacing    OPTIONAL,    Need R
            maxPUSCH-Duration    ENUMERATED {ms0p02, ms0p04, ms0p0625,
ms0p125, ms0p25, ms0p5, spare2, spare1}
OPTIONAL,    Need R
            configuredGrantType1Allowed ENUMERATED [true]
OPTIONAL,    Need R
            logicalChannelGroup INTEGER (0..maxLCG-ID)
OPTIONAL, Need R
            schedulingRequestID SchedulingRequestId
OPTIONAL,    Need R
            logicalChannelSR-Mask         BOOLEAN,
            logicalChannelSR-DelayTimerApplied BOOLEAN,
            ...,
            bitRateQueryProhibitTimer    ENUMERATED {s0, s0dot4,
s0dot8, s1dot6, s3, s6, s12, s30}         OPTIONAL    Need R
        } OPTIONAL,    Cond SL
        ...,
    }
```

Figure 6D:
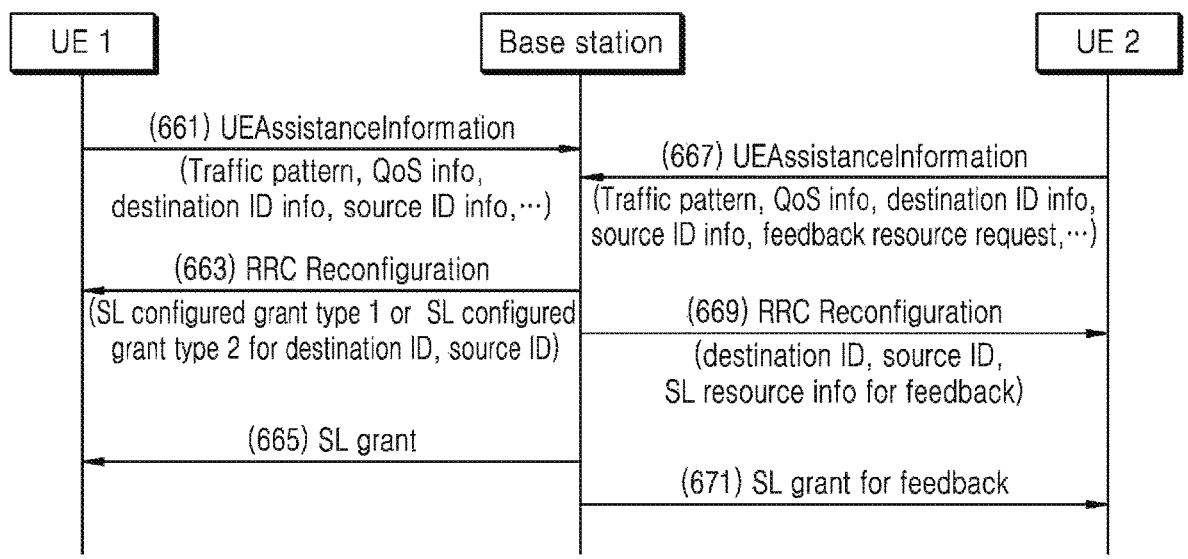
FIG. 6D illustrates another signal procedure in a sidelink resource grant mode 1 for direct communication between UEs, according to an embodiment of the disclosure.
Figure 6E:
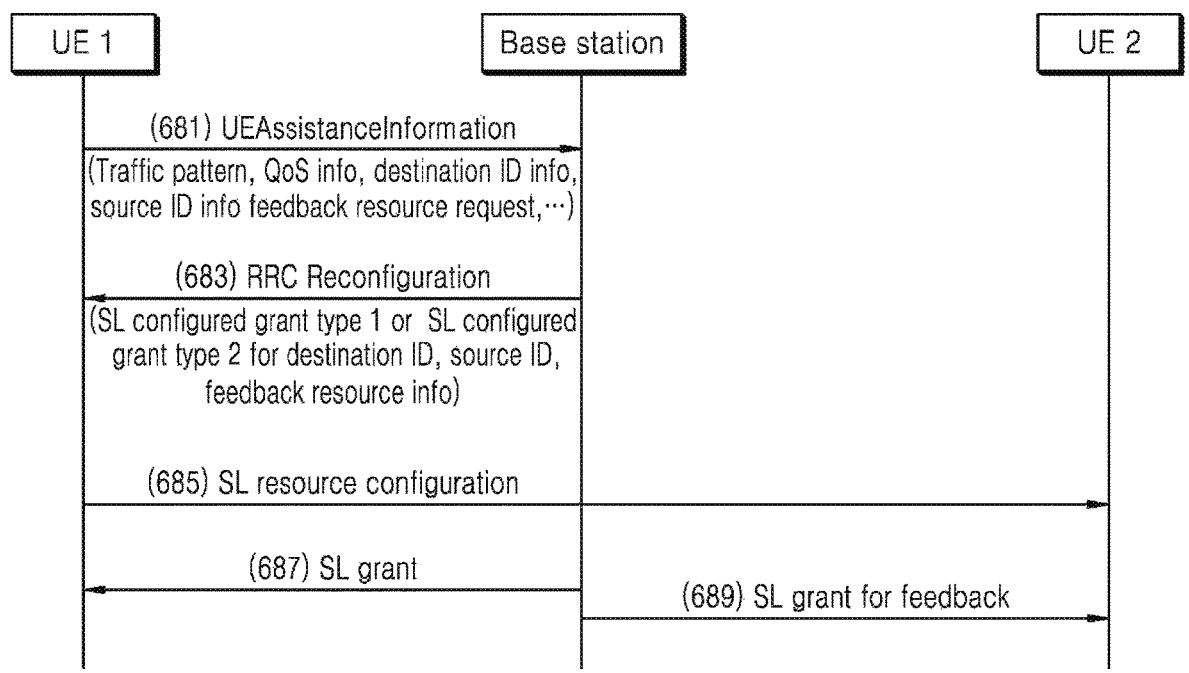
FIG. 6E illustrates another signal procedure in a sidelink resource grant mode 1 for direct communication between UEs, according to an embodiment of the disclosure.

FIGS. 6D and 6E illustrate a procedure using UEAssistanceInformation signaling exchange according to various embodiments of the disclosure.

Referring to FIGS. 6D and 6E, in case that the UE transmits a UEAssistanceInformation message to the BS to request sidelink (SL) resources (including a V2X packet and an HARQ feedback), this case may include a case where the UE receives a System information message (e.g., sibTypeV2X) including information indicating that the BS supports a V2X sidelink function. In an embodiment of FIGS. 6A through 6C, it may be assumed that UE1 is a TX UE and UE2 is an RX UE. When unicast-based V2X packet transmission/reception is performed, the RX UE may transmit an HARQ feedback with respect to a V2X packet.

Referring to FIG. 6D, according to an embodiment of the disclosure, in operation 661, UE1 may transmit a UEAssistanceInformation message including information necessary for sidelink V2X packet transmission resource grant to the BS. A request for a sidelink transmission resource based on the UEAssistanceInformation message may be used when the UE is granted with a sidelink transmission resource (a V2X packet or an HARQ feedback) by using at least one of SPS, Configured Grant Type 1, or Configured Grant Type 2). In operation 663, the BS may configure a sidelink transmission resource or SL resource to be used by UE1 for direct communication, based on information of UE1, and transmit an RRCConnectionReconfiguration message including resource grant information to UE1. The RRCConnectionReconfiguration message may include at least one of SPS-based resource grant information, Configured Grant Type 1-based resource grant information, or Configured Grant Type 2-based resource grant information. In operation 665, the BS may grant a sidelink transmission resource for V2X packet transmission of UE1. The sidelink transmission resource granted in operation 665 may support SPS, Configured Grant Type 1-based, or Configured Grant Type 2-based packet transmission.

In an embodiment of the disclosure where UE1 and UE2 transmit and receive a V2X packet in the unicast manner, UE2 may transmit an HARQ feedback with respect to the V2X packet transmitted by UE1. In operation 667, to be granted with a sidelink resource for HARQ feedback transmission, UE2 may transmit a UEAssistanceInformation message including information needed for HARQ feedback transmission resource grant to the BS. A request for a sidelink HARQ feedback transmission resource based on the UEAssistanceInformation message may be used for HARQ feedback transmission with respect to V2X packet transmission/reception using at least one of SPS, Configured Grant Type 1, or Configured Grant Type 2. In operation 669, the BS may configure a sidelink transmission resource to be used by UE2 for HARQ feedback transmission, based on information of UE2, and transmit an RRCConnectionReconfiguration message including the configured sidelink transmission resource to UE2. When the BS determines to directly schedule an HARQ feedback transmission resource according to sidelink resource grant information used for the HARQ feedback, included in the RRCConnectionReconfiguration message received in operation 669, then UE2 may be granted with a sidelink resource to be used for HARQ feedback transmission from the BS in operation 671.

Referring to FIG. 6E, according to an embodiment of the disclosure, in operation 681, UE1 may transmit a UEAssistanceInformation message including information necessary for sidelink V2X packet transmission resource grant to the BS. A request for a sidelink transmission resource based on the UEAssistanceInformation message may be used when the UE is granted with a sidelink transmission resource (a V2X packet or an HARQ feedback) by using at least one of SPS, Configured Grant Type 1, or Configured Grant Type 2). In operation 683, the BS may configure a sidelink transmission resource or SL resource to be used by UE1 for direct communication, based on information of UE1, and transmit an RRCConnectionReconfiguration message including resource grant information to UE1. The RRCConnection- Reconfiguration message may include at least one of SPS-based resource grant information, Configured Grant Type 1-based resource grant information, or Configured Grant Type 2-based resource grant information. In operation 687, the BS may grant a sidelink transmission resource for V2X packet transmission of UE1. The sidelink transmission resource granted in operation 687 may support SPS, Configured Grant Type 1-based, or Configured Grant Type 2-based packet transmission.

In an embodiment of the disclosure where UE1 and UE2 transmit and receive a V2X packet in the unicast manner, UE1 may transmit a request for grant of a sidelink resource needed by UE2 to transmit an HARQ feedback with respect to the V2X packet received by UE2. UE1 may transmit to the BS, information required for HARQ feedback transmission resource grant of UE2 through the UEAssistanceInformation message transmitted to be granted with the sidelink resource for HARQ feedback transmission in operation 681. A request for a sidelink HARQ feedback transmission resource based on the UEAssistanceInformation message may be used for V2X packet transmission/reception using at least one of SPS, Configured Grant Type 1, or Configured Grant Type 2. In operation 683, the BS may configure the sidelink transmission resource for HARQ feedback transmission of UE2 and transmit the RRCConnectionReconfiguration message including sidelink transmission resource configuration information for the HARQ feedback to UE1. In operation 685, UE1 may deliver the sidelink transmission resource configuration information for the HARQ feedback to UE2. An SL resource configuration message delivered in operation 685 may also include sidelink transmission resource configuration information to be used by UE1 for V2X packet transmission. When the BS determines to directly schedule an HARQ feedback transmission resource according to sidelink resource grant information used for the HARQ feedback, included in the RRCConnectionReconfiguration message received in operation 683, then UE2 may be granted with a sidelink resource to be used for HARQ feedback transmission from the BS in operation 689.

In another embodiment of the disclosure, to request a HARQ feedback transmission resource for a V2X packet transmitted based on SPS, Configured Grant Type 1, or Configured Grant Type 2, UE2 may transmit SL-HARQ feedback request grant signaling to the BS. SL-HARQ feedback request grant signaling may include at least one of destination ID, source ID, or sidelink configured grant ID (used as an identifier for identifying SPS, Configured Grant Type 1, or Configured Grant Type 2).

In an embodiment of FIGS. 6D through 6E, the UEAssistanceInformation message used for V2X sidelink packet transmission resource or sidelink HARQ feedback transmission resource grant may include at least one of the following parameters:

at least one of use case indicator, service ID, destination ID, group ID, unicast information, QoS indicator, UE's RAT capability, service flow ID, bearer ID, 5QI, PPPP, PPPR source ID, HARQ feedback information, or traffic pattern (periodicity, message size, timing offset); and at least one of HARQ feedback information that is a parameter used for a BS to grant a sidelink transmission resource for HARQ feedback of an RX UE, such as UE's HARQ feedback transmission capability (e.g., HARQ timing (a time required for UE until HARQ feedback transmission after V2X packet reception)), RF capability, or antenna capability.

```
UEAssistanceInformation-IEs::=     SEQUENCE {
  ···sl-ConfigurationGrantInformationSEQUENCE { //·Configuation
information of SPS, configured grant type 1, or configured grant type
      trafficPeriodicity              trafficPeriodicity,
      trafficDestination DST_ID, //·service·ID, flow·ID, bearer·ID
      sourceID           source_ID,
      priorityInfoListSL        ······PPPP_information,···//PPPP·index
      reliabilityInfoListSL     PPPR_information,···//PPPR·index
   ·····QoSInfoListSL             5QI_information
   ·····groupInfoListSL           group_information,·//group·ID
      unicastInfoListSL         unicast_information,·//unicast·session·
ID
      timingOffset       INTEGER (0..10239),
      logicalChannelIdentitySL       INTEGER (0..31),
      messageSize        BIT·STRING·(SIZE·(6)),
      sl-harqfeedbackInfo           sidelink_harqfeedback_information
···},
... 
}
```

According to an embodiment of the disclosure, the above-described parameter values trafficPeriodicity, cgType1IntervalSL, and cgType2IntervalSL may be as below.

sym2, sym7, sym1x14, sym2x14, sym4x14, sym5x14, sym8x14, sym10x14, sym16x14, sym20x14, sym32x14, sym40x14, sym64x14, sym80x14, sym128x14, sym160x14, sym256x14, sym320x14, sym512x14, sym640x14, sym1024x14, sym1280x14, sym2560x14, sym5120x14, sym6, sym1x12, sym2x12, sym4x12, sym5x12, sym8x12, sym10x12, sym16x12, sym20x12, sym32x12, sym40x12, sym64x12, sym80x12, sym128x12, sym160x12, sym256x12, sym320x12, sym512x12, sym640x12, sym1280x12, sym2560x12

The RRCConnectionReconfiguration message used for transmission of SPS-based, Configured Grant type 1-based, or Configured Grant type 2-based sidelink transmission resource grant information may include at least one of the following parameters:

<Sidelink Transmission Resource Grant Information Based on Configured Grant Type 1>

```
    CGType1-ConfigSL-ToAddModList::=SEQUENCE(SIZE
(1..maxConfigCGType1))OF CGType1-ConfigSL
    CGType1-ConfigSL-ToReleaseList::=SEQUENCE(SIZE
(1..maxConfigCGType1))OF CGType1-ConfigIndex
    CGType1-ConfigIndex::= INTEGER(1..maxConfigCGType1)
    CGType1_ConfigSL    SEQUENCE {
     cgType1-ConfigIndex CGType1-ConfgIndex,
     timeDomainOffset        INTEGER(0..5119),
     timeDomainAllocation     INTEGER (0..15),
     frequencyDomainAllocation          BIT STRING(SIZE(18)),
     mcsAndTBS              INTEGER(0..31),
     frequencyHoppingOffset  INTEGER(1..
maxNrofPhysicalResourceBlocks-1)        OPTIONAL,    Need R
     pathlossReferenceIndex INTEGER
(0..maxNrofPUSCH-PathlossReferenceRSs-1),
     cgType1IntervalSL CGType1IntervalSL,
   harqFeedback HARQFeedbackConfig,
     ...
    }
    CGType1-ConfigIndex::=INTEGER(1..maxConfigCGType1)
```

<Sidelink Transmission Resource Grant Information Based on Configured Grant Type 2 or SPS>

```
    CGType2-Config::=      SEQUENCE {
     sl-CGType2-V-RNTI      C-RNTI OPTIONAL,    Need OR
     cgType2-ConfigSL-ToAddModList    CGType2-ConfigSL-ToAddModList
    OPTIONAL,    Need ON
     cgType2-ConfigSL-ToReleaseList    CGType2-ConfigSL-ToReleaseLis
    OPTIONAL    Need ON
    }
    CGType2-ConfigSL-ToAddModList::=SEQUENCE(SIZE
(1..maxConfigCGType2))OF CGType2-ConfigSL
    CGType2-ConfigSL-ToReleaseList::=SEQUENCE(SIZE
(1..maxConfigCGType2))OF CGType2-ConfigIndex
    CGType2-ConfigSL::=    SEQUENCE {
       cgType2-ConfigIndex         CGType2-ConfigIndex,
       cgType2IntervalSL    CGType2IntervalSL,
       harqFeedback         HARQFeedbackConfig,
    }
     CGType2-ConfigIndex::=    INTEGER(1..maxConfigCGType2)
```

HARQ feedback resource grant information for V2X sidelink packet transmission based on SPS, Configured Grant type 1, or Configured Grant type 2 may include at least one of the following information:

information of commTxFeedbackResources, HARQ feedback resource pattern, start time, feedback resource period, resource time info, resource frequency info, HARQ feedback UE ID, MCS Referring to various embodiments of the disclosure shown in FIGS. 7 through 10, a description will be made of a case where the UE grants the sidelink transmission resource (V2X packet or HARQ feedback) without intervention of the BS. A case where the UE grants a sidelink transmission resource without intervention of the BS may correspond to a case where the BS sets through the RRC-ConnectionReconfiguration message, a mode (mode2) in which the UE schedules sidelink V2X packet transmission resource grant or sidelink HARQ feedback transmission resource grant, or a case where the UE determines to perform an operation of mode2 in the embodiment of FIGS. 6A through 6E.

Figure 7A:
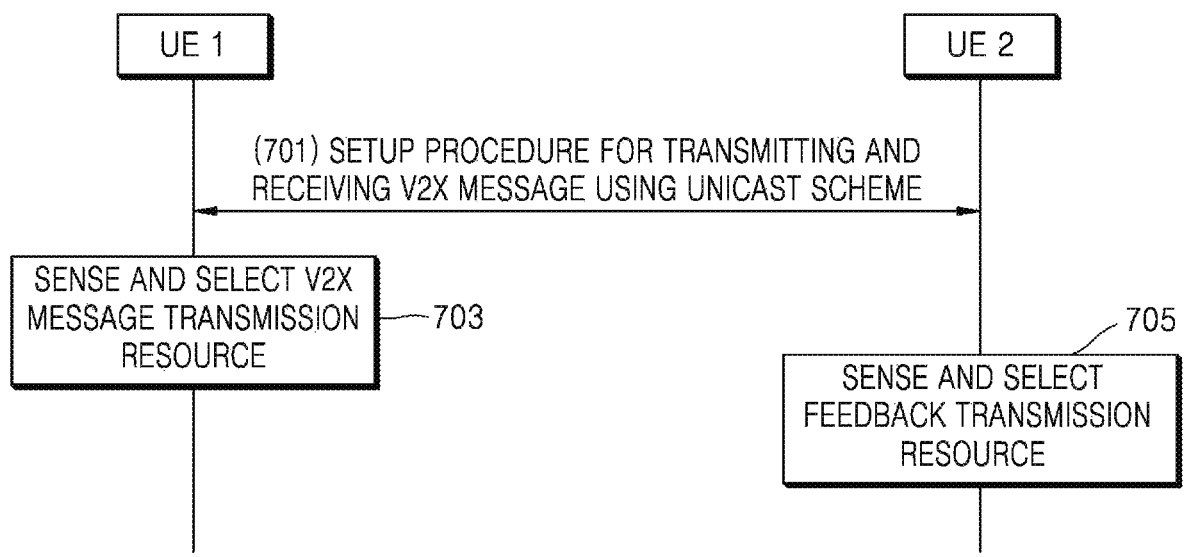
FIG. 7A illustrates a signal procedure in a sidelink resource grant mode 2$a$ for direct communication between UEs, according to an embodiment of the disclosure.
Figure 7B:
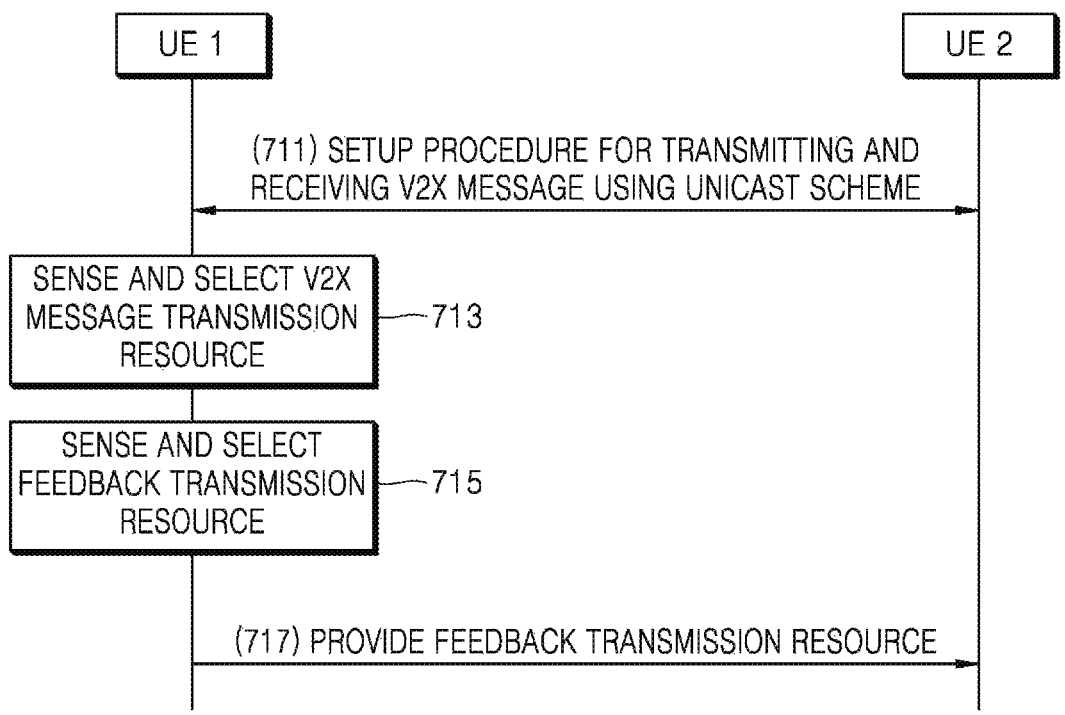
FIG. 7B illustrates another signal procedure in a sidelink resource grant mode 2$a$ for direct communication between UEs, according to an embodiment of the disclosure.
Figure 8A:
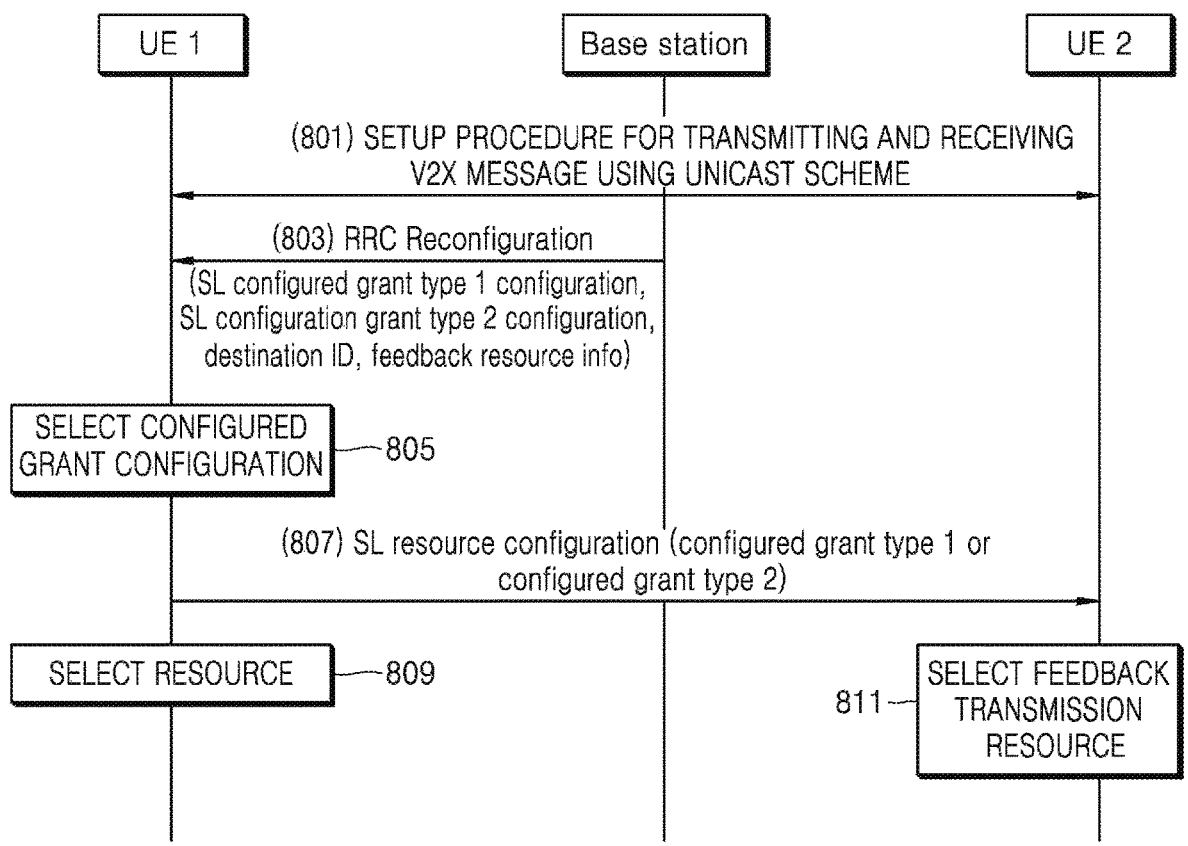
FIG. 8A illustrates a signal procedure in a sidelink resource grant mode 2$c$ for direct communication between UEs, according to an embodiment of the disclosure.
Figure 8B:
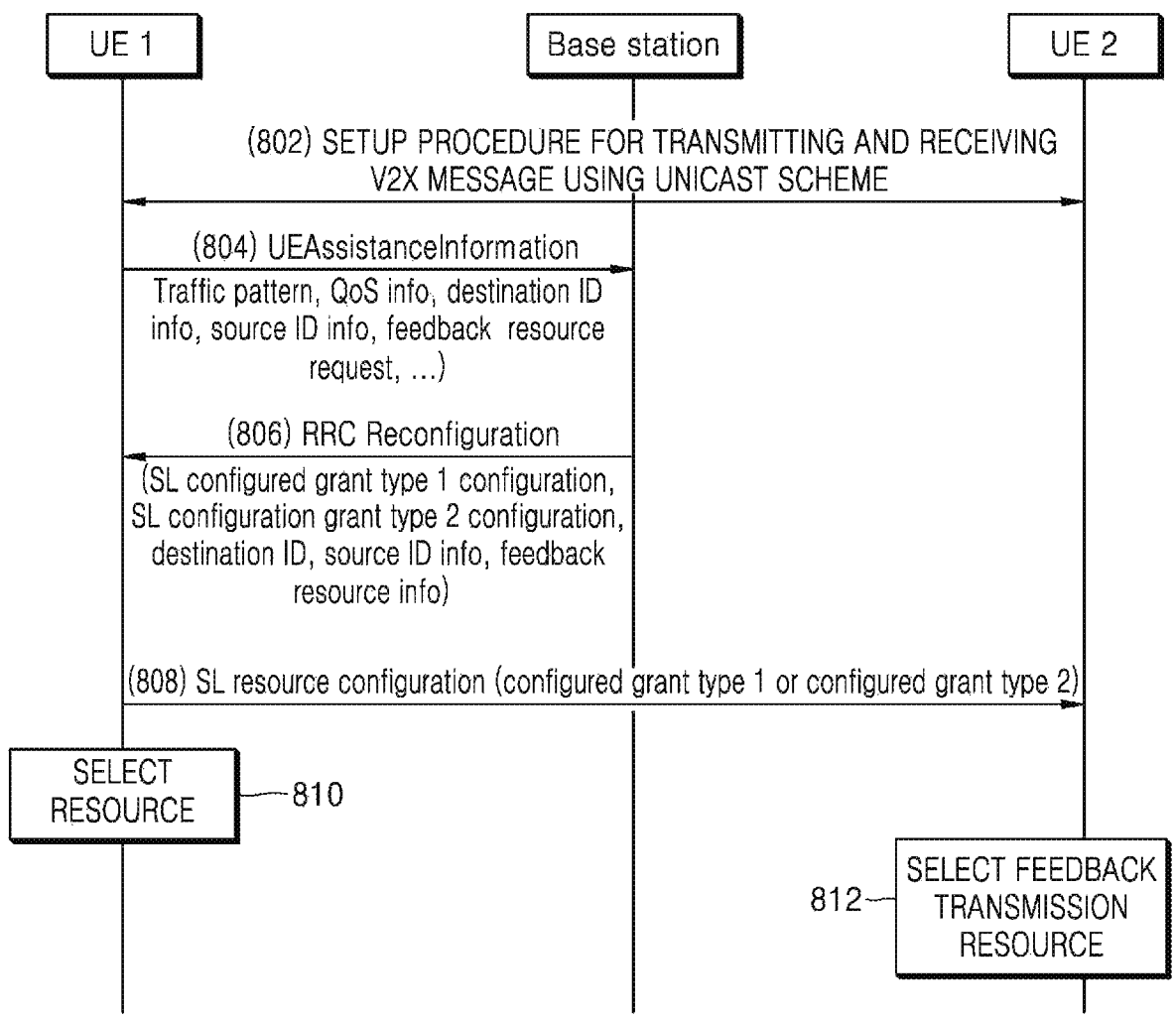
FIG. 8B illustrates another signal procedure in a sidelink resource grant mode 2$c$ for direct communication between UEs, according to an embodiment of the disclosure.
Figure 8C:
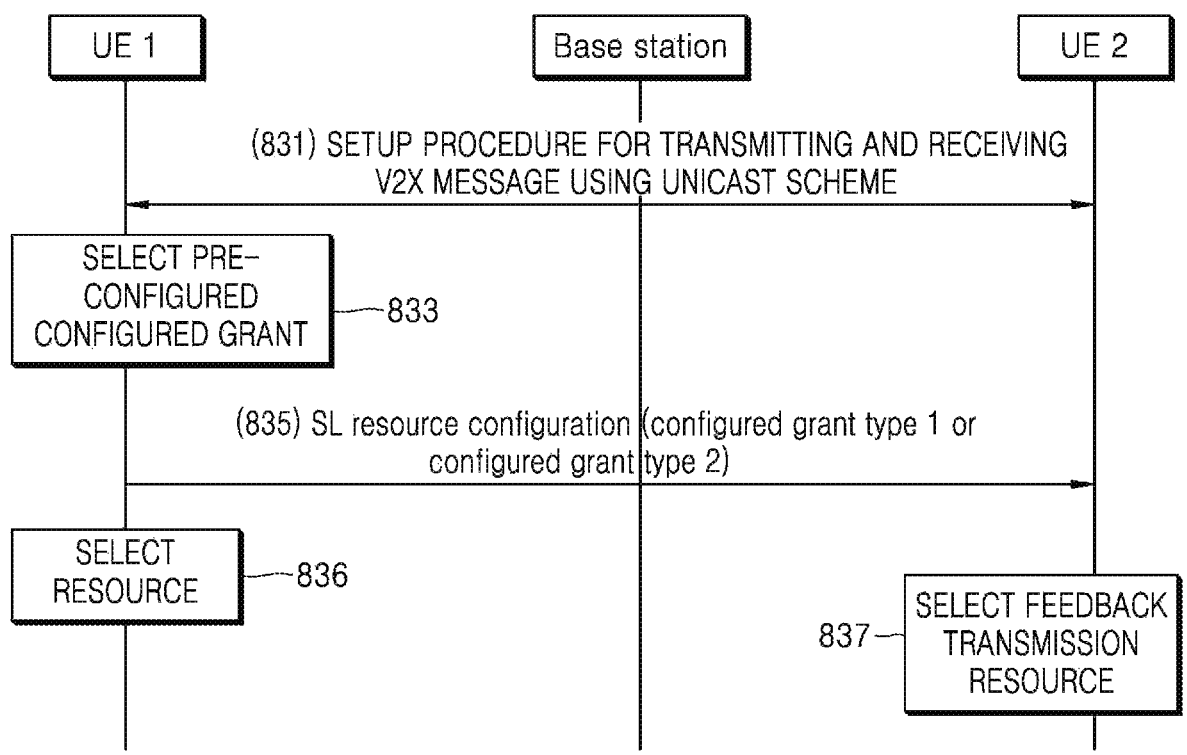
FIG. 8C illustrates another signal procedure in a sidelink resource grant mode 2$c$ for direct communication between UEs, according to an embodiment of the disclosure.
Figure 8D:
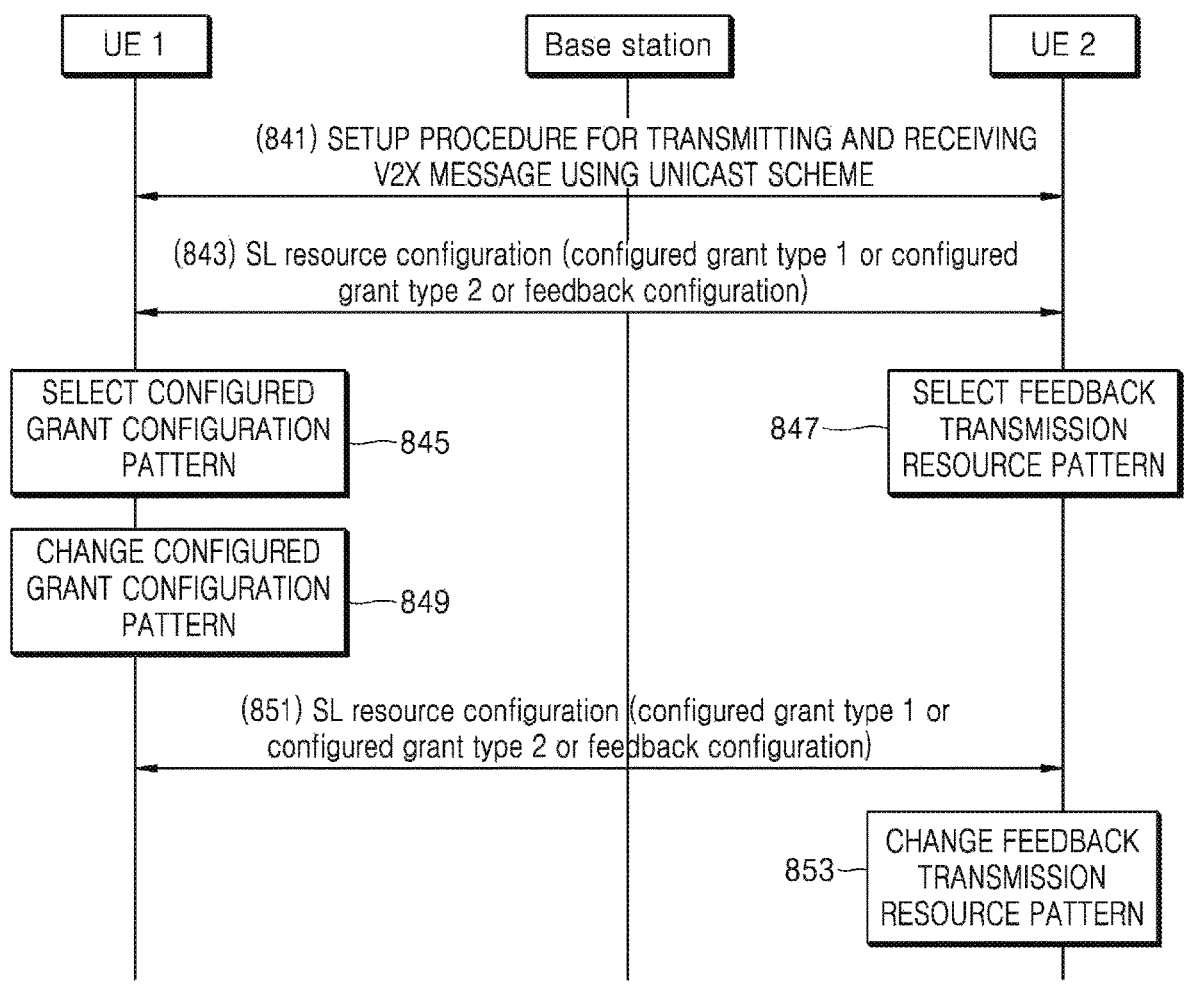
FIG. 8D illustrates another signal procedure in a sidelink resource grant mode 2$c$ for direct communication between UEs, according to an embodiment of the disclosure.
Figure 9A:
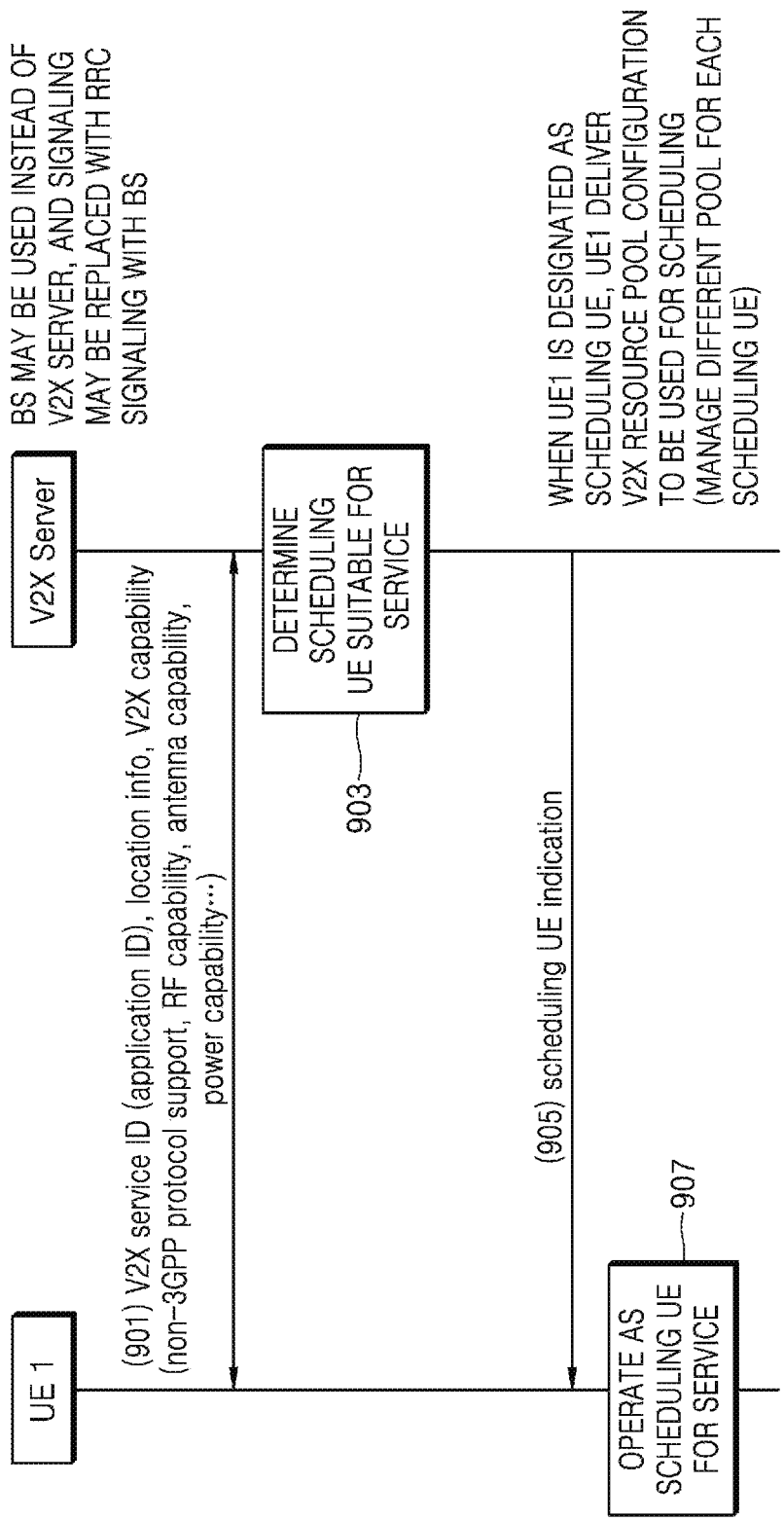
FIG. 9A illustrates a signal procedure in a sidelink resource grant mode 2$d$ for direct communication between UEs, according to an embodiment of the disclosure.
Figure 9B:
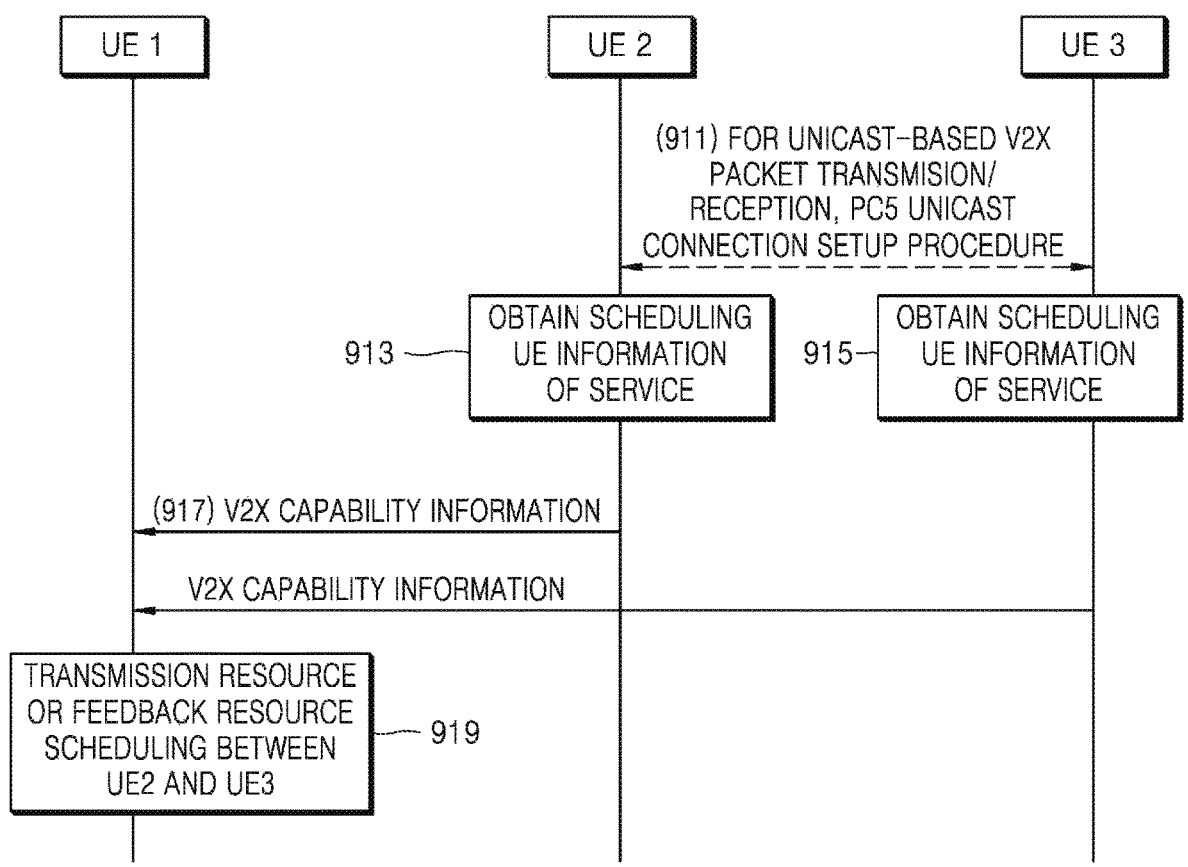
FIG. 9B illustrates another signal procedure in a sidelink resource grant mode 2$d$ for direct communication between UEs, according to an embodiment of the disclosure.

FIGS. 7A and 7B illustrate an example of a sidelink resource grant mode 2a where the UE grants a sidelink transmission resource (V2X packet or HARQ feedback) to be used to itself, FIGS. 8A through 8D illustrate an example of a sidelink resource grant mode 2c where the UE grants a sidelink transmission resource based on a configured grant type, FIGS. 9A and 9B illustrate an example of a sidelink resource grant mode 2d where the UE grants a sidelink transmission resource of another UE, and FIG. 10 illustrates an example of a sidelink resource grant mode 2b where the UE assists sidelink transmission resource grant of another UE.

FIGS. 7A and 7B illustrate a signal procedure in a sidelink resource grant mode 2a for direct communication between UEs, according to various embodiments of the disclosure. In an embodiment of FIGS. 7A and 7B, it may be assumed that UE1 is a TX UE and UE2 is an RX UE.

Referring to FIG. 7A, in operation 701, a setup procedure for transmitting/receiving a unicast-based V2X sidelink packet between UE1 and UE2 may be performed. Operation 701 may be performed when UE1 and UE2 perform unicast-based V2X sidelink packet transmission/reception. When UE1 and UE2 perform broadcast-based V2X sidelink packet transmission/reception, operation 701 may not be performed. UE1 may select a sidelink resource to be used for V2X packet transmission, in operation 703. UE1 may sense a sidelink resource configured by the UE for mode 2 or mode 2a through RRC dedicated signaling or a pre-configured sidelink resource and grant the sidelink resource. In operation 703, a sidelink transmission resource granted by UE1 may include at least one of a dynamic resource grant (one shot grant), a Configured Grant Type 1 grant, or a Configured Grant Type 2 grant. The sidelink transmission resource granted by UE1 may support V2X service information, i.e., at least one of service ID, application ID, destination ID, source ID, QoS information, priority information, traffic pattern information, or HARQ feedback capability. The HARQ feedback capability may include at least one of UE2's HARQ timing (a time required for HARQ feedback transmission after V2X packet transmission), an RF configuration, or an antenna configuration. When unicast-based V2X packet transmission/reception is performed, UE1 may share the granted sidelink transmission resource (an SL grant or an SL resource pool) to UE2. When unicast-based V2X packet transmission/reception is performed, UE2 may transmit an HARQ feedback with respect to a V2X packet. UE2 may grant a sidelink resource necessary for HARQ feedback transmission to itself, in operation 705. UE2 may select an HARQ feedback transmission resource by considering its HARQ feedback capability. The HARQ feedback transmission resource granted by UE2 may support V2X service information, i.e., at least one of service ID, application ID, destination ID, source ID, QoS information, priority information, traffic pattern information, or HARQ feedback capability. UE2 may select the HARQ feedback transmission resource corresponding to a V2X packet transmission resource granted by UE1. UE2 may share the HARQ feedback transmission resource granted in operation 705 with UE1.

Referring to FIG. 7B, in operation 711, a setup procedure for transmitting/receiving a unicast-based V2X sidelink packet between UE1 and UE2 may be performed. Operation 711 may be performed when UE1 and UE2 perform unicast-based V2X sidelink packet transmission/reception. When UE1 and UE2 perform broadcast-based V2X sidelink packet transmission/reception, operation 711 may not be performed. UE1 may select a sidelink resource to be used for V2X packet transmission, in operation 713. UE1 may sense a sidelink resource configured by the UE for mode 2 or mode 2a through RRC dedicated signaling or a pre-configured sidelink resource and grant the sidelink resource. In operation 713, a sidelink transmission resource granted by UE1 may include at least one of a dynamic resource grant (one shot grant), a Configured Grant Type 1 grant, or a Configured Grant Type 2 grant. The sidelink transmission resource granted by UE1 may support V2X service information, i.e., at least one of service ID, application ID, destination ID, source ID, QoS information, priority information, traffic pattern information, or HARQ feedback capability. The HARQ feedback capability may include at least one of UE2's HARQ timing (a time required for HARQ feedback transmission after V2X packet transmission), an RF configuration, or an antenna configuration. When unicast-based V2X packet transmission/reception is performed, UE1 may grant the HARQ feedback transmission resource to UE2 according to UE2's HARQ feedback capability in operation 715. UE1 may share the granted sidelink transmission resource (an SL grant or an SL resource pool) or HARQ feedback transmission resource with UE2 in operation 717. UE2 may transmit an HARQ feedback by using the HARQ feedback transmission resource granted by UE1.

In the embodiment of FIGS. 7A and 7B, information of the sidelink packet transmission resource or the sidelink HARQ feedback transmission resource, shared between UE1 and UE2, may be as below.

The information of the sidelink packet transmission resource may include at least one of an ue-Selected information element (IE) of commTxResources of RRCConnectionReconfiguration, CGType1-Config IE, or CGType2-Config IE.

The information of the sidelink HARQ feedback transmission resource may include at least one of an ue-Selected IE of commTxFeedbackResources of RRCConnectionReconfiguration, harqFeedback IE of CGType1-Config, or harqFeedback IE of CGType2-Config.

FIGS. 8A through 8D illustrate a signal procedure in a sidelink resource grant mode 2c for direct communication between UEs, according to various embodiments of the disclosure;

In an embodiment of FIGS. 8A through 8D, it may be assumed that UE1 is a TX UE and UE2 is an RX UE. Although various embodiments of FIGS. 8A through 8D will be described based on Configured Grant Type 1 configuration information, they may also be equally applied when SPS or Configured Grant Type 2 configuration information is used. The configuration information may include one or more pattern information of SPS, Configured Grant Type 1, or Configured Grant Type 2. The pattern information may be made based on at least one of traffic periodicity, timing offset, service ID, QoS information, priority information, or a message size of a V2X packet using SPS, CGType1, or CGType2. The pattern information may be managed by a BS or V2X server for each mobile network operator (MNO) network or automatic original equipment manufacturer (OEM) and provided to a UE. In an embodiment of the disclosure, a UE may obtain configuration information of at least one of sidelink SPS, Configured Grant Type 1, or Configured Grant Type 2 from a BS.

Referring to FIG. 8A, in operation 801, a setup procedure for transmitting/receiving a unicast-based V2X sidelink packet between UE1 and UE2 may be performed. Operation 801 may be performed when UE1 and UE2 perform unicast-based V2X sidelink packet transmission/reception. In operation 803, UE1 may receive the Configured Grant Type 1 configuration information and obtain pattern information of CGType 1. The CGType 1 pattern information of the Configured Grant type 1 configuration information may include information of an SL CG Type 1 configuration (CGType1_ConfigSL) IE of FIGS. 6A through 6E. In operation 805, UE1 may select a CGType 1 pattern based on traffic attributes of a V2X packet to be transmitted.

When one CGType 1 pattern is configured in operation 803, the configured CGType 1 pattern may be used. For unicast-based V2X packet transmission/reception, UE1 may determine the CGType 1 pattern based on exchange of V2X traffic pattern and HARQ feedback capability information between UE1 and UE2. When one or more patterns are configured in operation 803, UE1 may monitor a sidelink resource of each pattern and select a pattern having the lowest congestion ratio or a congestion ratio that is less than a threshold. The threshold for the congestion ratio used for pattern selection may be preset for V2X service type, QoS info, or priority info (information configured by the BS or pre-configured information). Information about a time for performing sidelink resource monitoring of the pattern (a sensing period or a sensing interval) may be information configured by the BS or pre-configured information. When UE1 and UE2 perform unicast-based V2X packet transmission/reception, UE1 may deliver the CGType 1 pattern information selected in operation 805 to UE2, in operation 807. UE2 may obtain V2X packet transmission resource grant and HARQ feedback transmission resource grant information from the CGType 1 pattern information received in operation 807. In operation 811, UE2 may select a HARQ feedback transmission resource to correspond to the CGType 1 pattern selected by UE1.

According to an embodiment of the disclosure, a scheme for UE2 to select the HARQ feedback transmission resource in operation 811 may be as below.

Mapping information between the CGType 1 pattern and the HARQ feedback transmission resource corresponding thereto may be delivered from the BS to UE1. The mapping information may be delivered from UE1 to UE2. The mapping information may be configured as a pre-configuration parameter. The HARQ feedback transmission resource may be defined to correspond to each Configured Grant Type 1 pattern. The mapping information may include an HARQ feedback transmission resource pattern mapped to each CGType 1 transmission resource pattern. For example, the mapping information may include at least one of a pattern ID, a CGType 1 pattern, or an HARQ feedback pattern as below. When UEs performing unicast-based V2X packet transmission/reception are aware of a mapping information list between CGType 1 patterns and corresponding HARQ feedback patterns and manage the mapping information list in the form of indices (pattern IDs), then V2X packet transmission resources for unicast packet transmission between UE1 and UE2 and HARQ feedback transmission resources may be exchanged as mapping information indices.

```
CGType1PatternSL SEQUENCE {
  patternID    Pattern_ID,
  cgType1Pattern   CGType1_ConfigSL, // Or ·CGType1-
  ConfigIndex·Used
  harqFeedbackPattern   HARQFeedbackConfig,
  ...
}
```

According to another embodiment of the disclosure, the BS may select CGType 1 pattern information to be used by UE1 in operation 803, and grant the selected CGType 1 pattern information to UE1 through RRCConnectionConfiguration. UE1 may select a V2X packet transmission resource from the CGType 1 pattern granted by the BS in operation 809. UE1 may select the V2X packet transmission resource by using a sensing procedure.

Referring to FIG. 8B, in operation 802, a setup procedure for transmitting/receiving a unicast-based V2X sidelink packet between UE1 and UE2 may be performed. Operation 802 may be performed when UE1 and UE2 perform unicast-based V2X sidelink packet transmission/reception. UE1 may transmit a UEAssistanceInformation message or a SidelinkUEInformation message to the BS in operation 804. UEAssistanceInformation or SidelinkUEInformation may provide information used by the BS to configure CGType 1 pattern information, and may include at least one of UEAssistanceInformation or SidelinkUEInformation of FIGS. 6A through 6E. In the remaining procedure of FIG. 8B, operations 806, 808, 810, and 812 of UE1 and UE2 may be the same as those of UE1 and UE2 in the above-described embodiment of FIG. 8A.

In another embodiment of the disclosure, a UE may obtain configuration information of at least one of sidelink SPS, Configured Grant Type 1, or Configured Grant Type 2 from a pre-configured pre-configuration parameter.

Referring to FIG. 8C, in operation 831, a setup procedure for transmitting/receiving a unicast-based V2X sidelink packet between UE1 and UE2 may be performed. Operation 831 may be performed when UE1 and UE2 perform unicast-based V2X sidelink packet transmission/reception. UE1 may obtain the CGType 1 pattern configuration information from the pre-configuration parameter. A criterion for UE1 to select the CGType 1 pattern information may include at least one of a service ID, QoS Info, or priority Info of a V2X packet to be transmitted by UE1, traffic pattern information, or HARQ feedback capability. In the remaining procedure of FIG. 8C, operations 833, 835, 836, and 837 of UE1 and UE2 may be the same as those of UE1 and UE2 in the above-described embodiment of FIG. 8A.

When UEs performing unicast-based V2X packet transmission/reception are aware of a CGType 1 pattern list, an HARQ feedback pattern list corresponding thereto, and mapping index information, the UEs may use mapping index information to indicate that the CGType 1 pattern to be used for V2X packet transmission/reception is changed.

Referring to FIG. 8D, in operation 841, a setup procedure for transmitting/receiving a unicast-based V2X sidelink packet between UE1 and UE2 may be performed. Operation 841 may be performed when UE1 and UE2 perform unicast-based V2X sidelink packet transmission/reception. Operations 843 through 847 may be the same as a procedure for exchanging a CGType 1 pattern to be used for unicast-based V2X packet transmission/reception described in FIGS. 8A through 8C and corresponding HARQ feedback pattern. UE1 may determine to change the CGType 1 pattern to be used for unicast-based V2X packet transmission/reception with UE2, in operation 849. UE1 may transmit pattern ID information corresponding to the changed CGType 1 to UE2 through SL resource configuration signaling, in operation 851. UE2 may select an HARQ feedback pattern corresponding to a pattern ID corresponding to the changed CGType 1, in operation 853. The SL resource configuration signaling transmitted in operation 851 may include at least one of PC5 RRC, PC5 signaling, or PC5 MAC CE.

FIGS. 9A and 9B illustrate a signal procedure in a sidelink resource grant mode 2d for direct communication between UEs, according to various embodiments of the disclosure.

FIG. 9A illustrates a procedure for selecting a scheduling UE (playing a role in grating a sidelink transmission resource to another UE), according to an embodiment of the disclosure. Referring to FIG. 9A, UE1 may transmit its V2X information to a V2X server in operation 901. V2X information may include at least one of V2X service ID (application ID), location info, or V2X capability (non-3GPP based V2X protocol support, RF capability, antenna capability, power capability). In operation 903, the V2X server may select a UE that is to be in charge of the scheduling UE. To select the UE as the scheduling UE, information to be obtained by the V2X server or the BS may be as below.

UE supporting a non-3GPP-based V2X protocol (e.g., dedicated short range communications (DSRC)) (UE capable of determining interference and collision with a non-3GPP-based V2X technology and granting a resource having a low possibility of interference to another UE when the non-3GPP-based V2X technology and a sidelink resource are shared);

UE in a gNB coverage (UE capable of granting a sidelink resource for the advanced service by supporting an NR-V2X protocol);

UE supporting a sidelink resource sensing function (UE capable of granting a resource of P-UE having no sidelink resource sensing function); and location information (information needed to manage a sidelink resource pool to be used by a scheduling UE, based on a zone/an area/a geo network).

The V2X server may perform signaling indicating that UE1 is selected as the scheduling UE to UE1, in operation 905. Signaling for indicating the scheduling UE in operation 905 may include at least one of the following information:

sidelink transmission resource to be used by the scheduling UE (a V2X packet or an HARQ feedback), V2X resource pool configuration, service ID, destination ID, source ID; and when UE1 is designated as the scheduling UE, the V2X resource pool configuration to be used for scheduling by UE1 may be granted as an SL pool to be used in common by all scheduling UEs or as different SL pools for the respective scheduling UEs.

In operation 907, UE1 selected as the scheduling UE may play a role as the scheduling UE. To obtain capabilities of a TX UE and an RX UE that are to use sidelink resources (V2X packet transmission and HARQ feedback transmission), the scheduling UE may perform a capability negotiation procedure with the TX UE and the RX UE.

In an embodiment of FIG. 9A, a BS may be used instead of the V2X server, and signaling between UE1 and the BS may be replaced with RRC signaling.

While a description has been made with reference to FIG. 9A of an example where the V2X server or the BS determines the scheduling UE, for unicast-based V2X packet transmission/reception, negotiation may be performed such that one of two UEs functions as the scheduling UE.

FIG. 9B illustrates a procedure for obtaining information needed for the scheduling UE to schedule a sidelink transmission resource for another UE. Referring to FIG. 9B, in operation 911, a PC5 unicast connection setup procedure may be performed when UE2 and UE3 transmit and receive a unicast-based V2X sidelink packet. Operation 911 may be performed when UE2 and UE3 perform unicast-based V2X sidelink packet transmission/reception. In operations 913 through 915, UE2 or UE3 may obtain information of a scheduling UE that is to grant sidelink resources to be used for V2X packet transmission or HARQ feedback transmission. The information of the scheduling UE may be obtained using at least one of V2X signaling from the V2X server, RRC signaling transmitted from the BS, PC5 signaling (PC5 RRC or PC5 PHY preamble) transmitted by the scheduling UE, or pre-configuration. The scheduling UE may be configured differently for each V2X service, each V2X transmission mode (unicast, groupcast, or broadcast), each zone ID, or each location of UE2 or UE3. In operation 917, UE2 or UE3 may deliver V2X capability information to the scheduling UE. The V2X capability information may be delivered for each V2X service, each V2X transmission mode, each zone ID, or each location. In operation 919, the scheduling UE may schedule the V2X packet transmission resource or the HARQ feedback transmission resource based on the V2X capability of UE2 or UE3.

In an embodiment of the disclosure shown in FIG. 9B, information exchanged between UE2 and UE3 may include at least one of SidelinkUEInformation or UEAssistanceInformation or information included in RRCConnectionReconfiguration. When a CGType-based transmission resource grant mode is used, the scheduling UE may select and grant a pattern. When a CGType-based transmission resource grant mode is used, the scheduling UE may set a pattern for a UE.

Figure 10A:
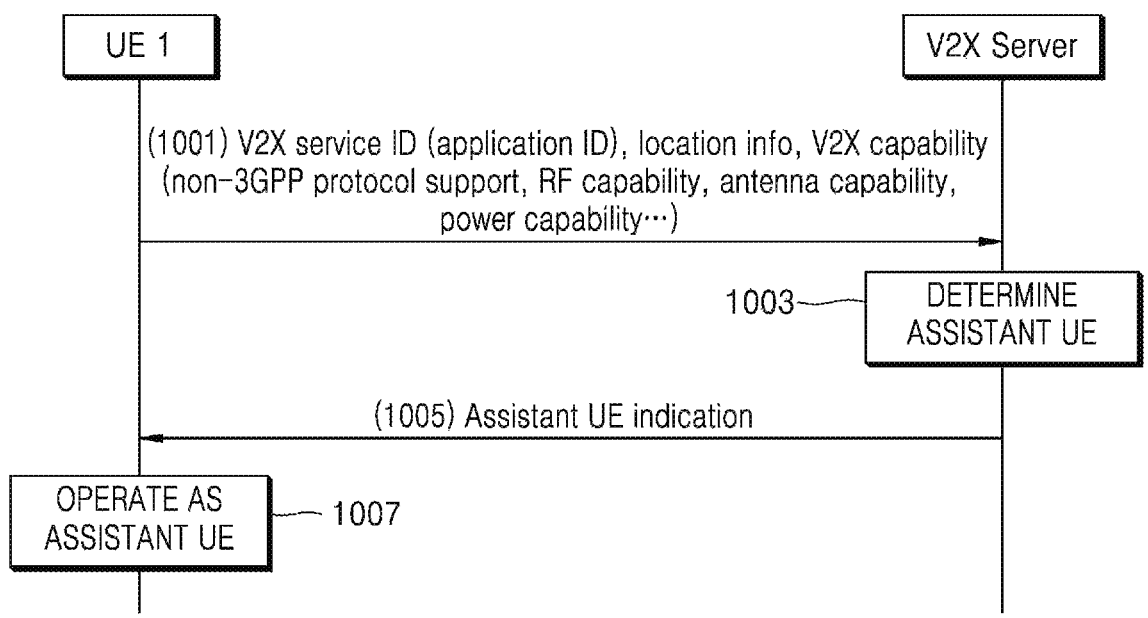
FIG. 10A illustrates a signal procedure in a sidelink resource grant mode 2$b$ for direct communication between UEs, according to an embodiment of the disclosure.
Figure 10B:
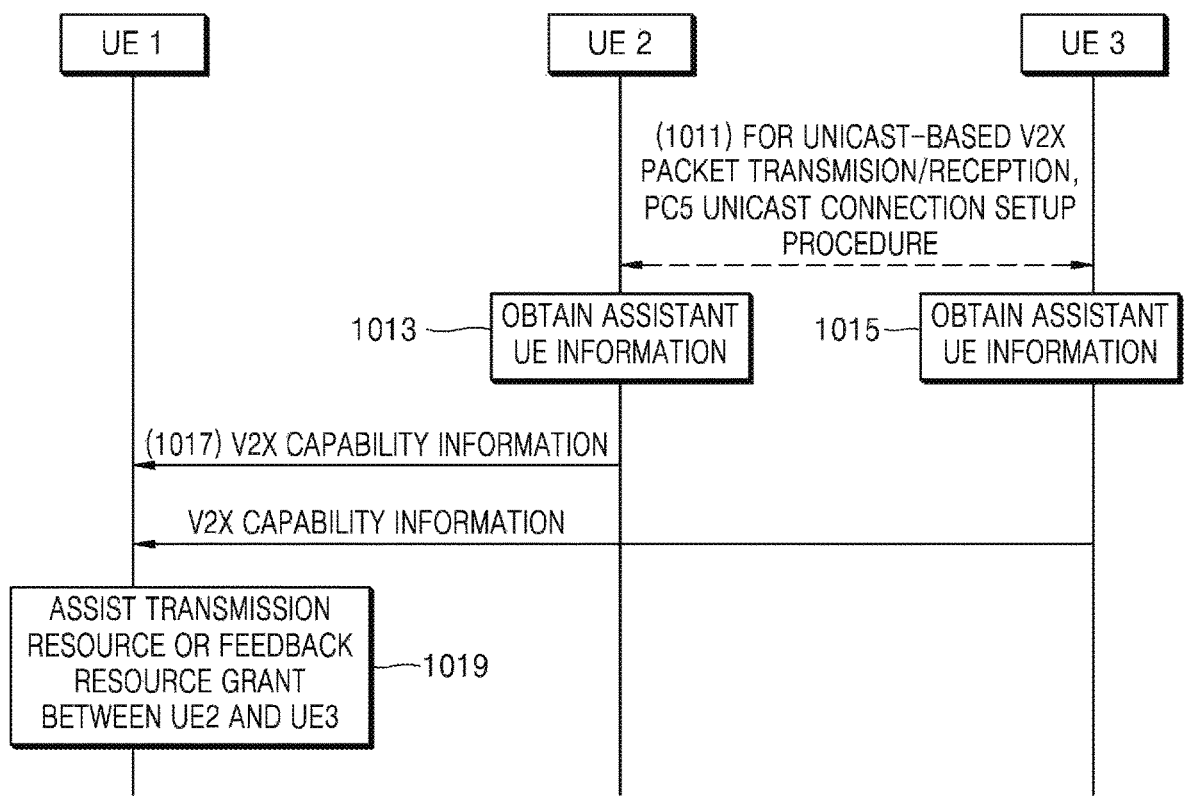
FIG. 10B illustrates another signal procedure in a sidelink resource grant mode 2$b$ for direct communication between UEs, according to an embodiment of the disclosure.

FIGS. 10A and 10B illustrate a signal procedure in a sidelink resource grant mode 2b for direct communication between UEs, according to various embodiments of the disclosure.

FIG. 10A illustrates a procedure for selecting an assistant UE (playing a role in assisting another UE in granting a sidelink transmission resource), according to an embodiment of the disclosure. The assistant UE needs to have capabilities to perform at least roles described below. Capability information of the assistant UE provided below may be delivered to the V2X server, the base station, or the scheduling UE.

The assistant UE may provide a UE to be granted with a sidelink transmission resource with information about a sidelink transmission resource pool from which the resource is to be selected.

The assistant UE may monitor a congestion ratio of a transmission resource pool and provide a pool having a low congestion ratio to another UE. The assistant UE may obtain a congestion ratio reference value corresponding to QoS or priority information required by a V2X packet.

The assistant UE may sense a transmission resource pool for a UE having no sensing function despite needing resource grant, and provide a transmission resource pool to be used for the UE having no sensing function.

The assistant UE may support a V2X protocol (e.g., LTE-V2X) of a previous version, monitor a resource pool when a sidelink transmission pool has to be shared with the V2X protocol of the previous version, select a resource pool having a low congestion ratio, and provide the selected resource pool to another UE.

The assistant UE may monitor a resource pool by using a non-3GPP-based V2X protocol when a sidelink transmission pool has to be shared with the non-3GPP-based V2X protocol, select a resource pool having a low congestion ratio, and provide the selected resource pool to another UE.

The assistant UE may monitor a resource pool instead of another UE that is not capable of supporting sidelink resource sensing provided in an E-UTRA system or sidelink resource sensing provided in an NGRA system, select a resource pool, and provide the selected resource pool to another UE.

The assistant UE may have a capability to determine Configured Grant Type-based sidelink resource grant or one-shot grant. The Configured Grant Type-based sidelink resource grant may have a capability to select a pattern. When CGType pattern selection is performed, a pattern-specific sidelink resource congestion ratio corresponding to a QoS level required by another UE may be measured.

The assistant UE may deliver SidelinkUEInformation or UEAssistanceInformation information of another UE to the scheduling UE.

The assistant UE may have to set PC5 RRC or PC5 signaling with the scheduling UE or another UE.

The assistant UE may be a UE in a gNB coverage. (UE may be capable of granting a sidelink resource for the advanced service by supporting an NR-V2X protocol)

The assistant UE may be selected as the same UE as the scheduling UE of FIGS. 9A and 9B. The assistant UE may be selected by the V2X server or the BS based on location information (for example, an RSU UE installed around a crosswalk may be selected). A leader of a platoon service group may be selected as the assistant UE.

Referring to FIG. 10A, UE1 may transmit its V2X information in operation 1001. V2X information may include at least one of V2X service ID (application ID), location information, or V2X capability (non-3GPP based V2X protocol support, RF capability, antenna capability, power capability). In operation 1003, the V2X server may select a UE that is to be in charge of the scheduling UE. To select the UE as the assistant UE, information to be obtained by the V2X server or the BS may be the same as the capability information. In operation 1005, the V2X server may perform signaling indicating that UE1 is selected as the assistant UE to UE1. Signaling for indicating the assistant UE in operation 1005 may include at least one of the following information:

sidelink transmission resource to be used by the assistant UE (a V2X packet or an HARQ feedback), V2X resource pool configuration, or V2X service information (service ID, destination ID, source ID)

In operation 1007, UE1 may play a role as the assistant UE. To obtain capabilities of a TX UE and an RX UE that are to use sidelink resources (V2X packet transmission and HARQ feedback transmission), the assistant UE may perform a capability negotiation procedure with the TX UE and the RX UE. The assistant UE may perform a capability negotiation procedure with the scheduling UE to assist scheduling of the scheduling UE.

In an embodiment of FIG. 10A, a BS may be used instead of the V2X server, and signaling between UE1 and the BS may be replaced with RRC signaling.

FIG. 10B illustrates a procedure for obtaining information needed for the assistant UE to assist sidelink transmission resource grant for another UE.

Referring to FIG. 10B, in operation 1011, a PC5 unicast connection setup procedure may be performed when UE2 and UE3 transmit and receive a unicast-based V2X sidelink packet. Operation 1011 may be performed when UE2 and UE3 perform unicast-based V2X sidelink packet transmission/reception. In operations 1013 through 1015, UE2 or UE3 may obtain information of the assistant UE that is to assist grant of sidelink resources to be used for V2X packet transmission or HARQ feedback transmission. The information of the assistant UE may be obtained using at least one of V2X signaling from the V2X server, RRC signaling transmitted from the BS, PC5 signaling (PC5 RRC or PC5 PHY preamble) transmitted by the assistant UE, or preconfiguration. The assistant UE may be configured differently for each V2X service, each V2X transmission mode (unicast, groupcast, or broadcast), each zone ID, or each location of UE2 or UE3.

In operation 1017, UE2 or UE3 may deliver V2X capability information to the assistant UE. The V2X capability information may be delivered for each V2X service, each V2X transmission mode, each zone ID, or each location. In operation 1019, the assistant UE may assist grant of the V2X packet transmission resource or the HARQ feedback transmission resource by UE2 or UE3, based on the V2X capability of UE2 or UE3. The assistant UE may obtain scheduling UE information of UE2 or UE3, and the scheduling UE may report grant of the V2X packet transmission resource or the HARQ feedback transmission resource by UE2 or UE3. The scheduling UE information by UE2 or UE3 may be obtained in the capability negotiation procedure with UE2 or UE3 or from the BS or the V2X server. In an embodiment of the disclosure shown in FIG. 10B, information exchanged between the assistant UE and the scheduling UE, UE2, or UE3 may include at least one of SidelinkUE-Information or UEAssistanceInformation or information included in RRCConnectionReconfiguration. When the assistant UE assists the CGType-based transmission resource grant, the assistant UE may select and provide a pattern.

FIGS. 11A through 11D illustrate a signal procedure for operating sidelink resource configuration information for direct communication between UEs, according to various embodiments of the disclosure.

Referring to FIGS. 11A to 11D, when a UE moves while obtaining V2X sidelink resource configuration information, the UE needs to identify validity of the resource configuration information. For example, when a service operated by the same automotive OEM is executed except for when the UE moves in a network operated by the same mobile operator, the same resource configuration information may be used regardless of whether the UE moves between cells or BSs. In another embodiment of the disclosure, to prevent a congestion ratio of resource use, a resource may be managed to use the same resource configuration information or different resource configuration information for each location (geo, area, or zone). According to various embodiments of the disclosure, a description will be made with reference to FIGS. 11A through 11D of an example where to determine whether the V2X sidelink resource configuration information is valid, the UE is in an idle state, in an inactive state, in a connected state, or out of coverage.

Figure 11A:
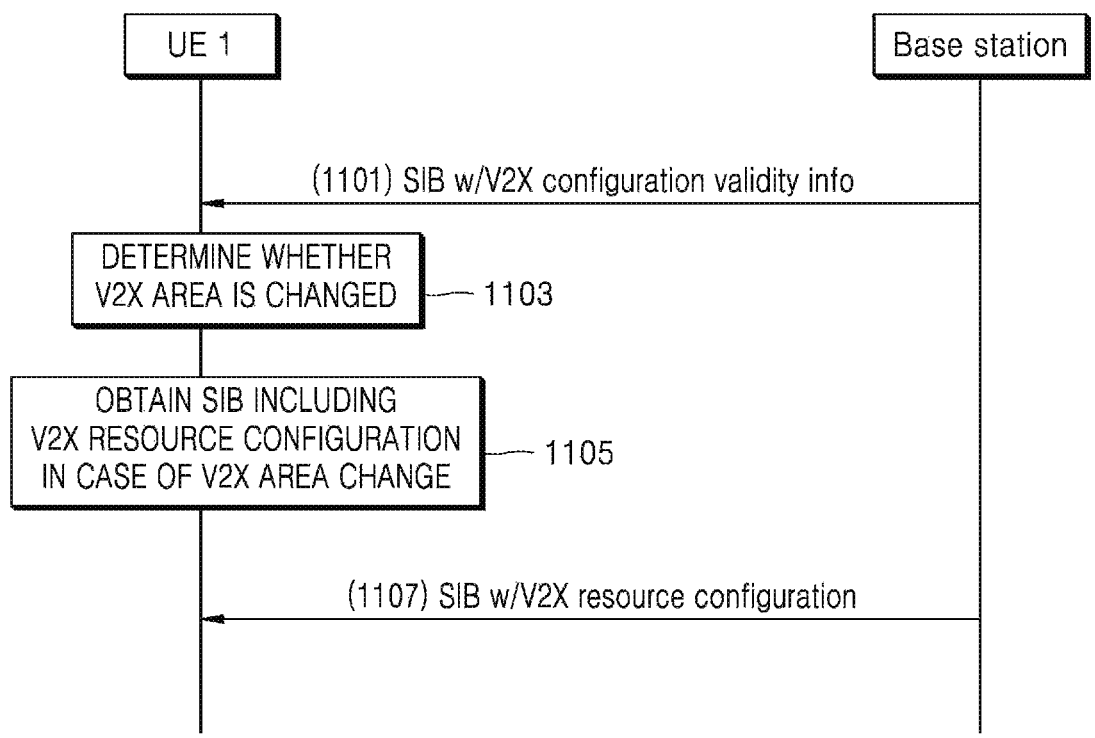
FIG. 11A illustrates a signal procedure for operating sidelink resource configuration information for direct communication between UEs, according to an embodiment of the disclosure.

FIG. 11A illustrates an example of a procedure for identifying validity of the V2X sidelink resource configuration information by the UE in the idle state or the in the inactive state.

Referring to FIG. 11A, in operation 1101, the UE may identify the validity of a V2X system information block (sibTypeV2X) stored in the UE, by receiving system information block (SIB) information including V2X configuration validity information. sibTypeV2X may include V2X sidelink resource configuration information available to the UE. The V2X configuration validity information may include a V2XareaScope parameter or a systemInformationV2XAreaID parameter.

```
SIB-TypeInfo ::= SEQUENCE {
    type         ENUMERATED {sibType2, sibType3, sibType4, sibType5,
sibType6, sibType7, sibType8, sibType9, sibTypeV2X, spare8, spare7, spare6,
spare5, spare4, spare3, spare2, spare1,...},
    valueTag     INTEGER (0..31)   OPTIONAL,  -- Cond SIB-TYPE
    areaScope    ENUMERATED {true} OPTIONAL,  -- Cond AREA-ID
    V2XareaScope ENUMERATED {true} OPTIONAL,  -- Cond V2X-AREA-ID
}
Cond 'V2X-AREA-ID' -- The field is mandatory present if
systemInformationV2XAreaID is present and the SIB is valid within the area
identified by systemInformationV2XAreaID, otherwise it is not present.
```

The area may include at least one of an area ID, a list of Cell(s), a list of RAN area IDs, or a list of TA IDs.

In operation 1103, the UE may identify a value of a V2XareaScope parameter and determine that sibTypeV2X of the UE is valid when the value of the V2XareaScope parameter is true. When the value of the V2XareaScope parameter is false, the UE may determine that sibTypeV2X is invalid. When the UE determines that the value of the V2XareaScope parameter is false, the UE may receive sibTypeV2X and obtain the V2X sidelink resource configuration information in operations 1105 through 1007.

According to an embodiment of the disclosure, an operation, performed by the UE, of identifying validity of sibTypeV2X by using V2XareaScope and systemInformationV2XAreaID may be as described below.

---

1> for each stored version of a SIB:
2> if the V2XareaScope value of the stored version of the SIB is the same as the value received from the serving cell:
3> if the stored SIB has an area scope and if the first PLMN-Identity included in the PLMN-IdentityInfoList, the systemInformationV2XAreaID and the valueTag that are included in the SIB1 received from the serving cell are identical to the PLMN-Identity, the systemInformationV2XAreaID and the valueTag associated with the stored version of that SIB; or
3> if the stored SIB is cell specific and if valueTag and CellIdentity included in the SIB1 received from the serving cell is identical to the valueTag and CellIdentity associated with stored version of that SIB;
4> consider the stored SIB as valid for the cell;

---

Figure 11B:
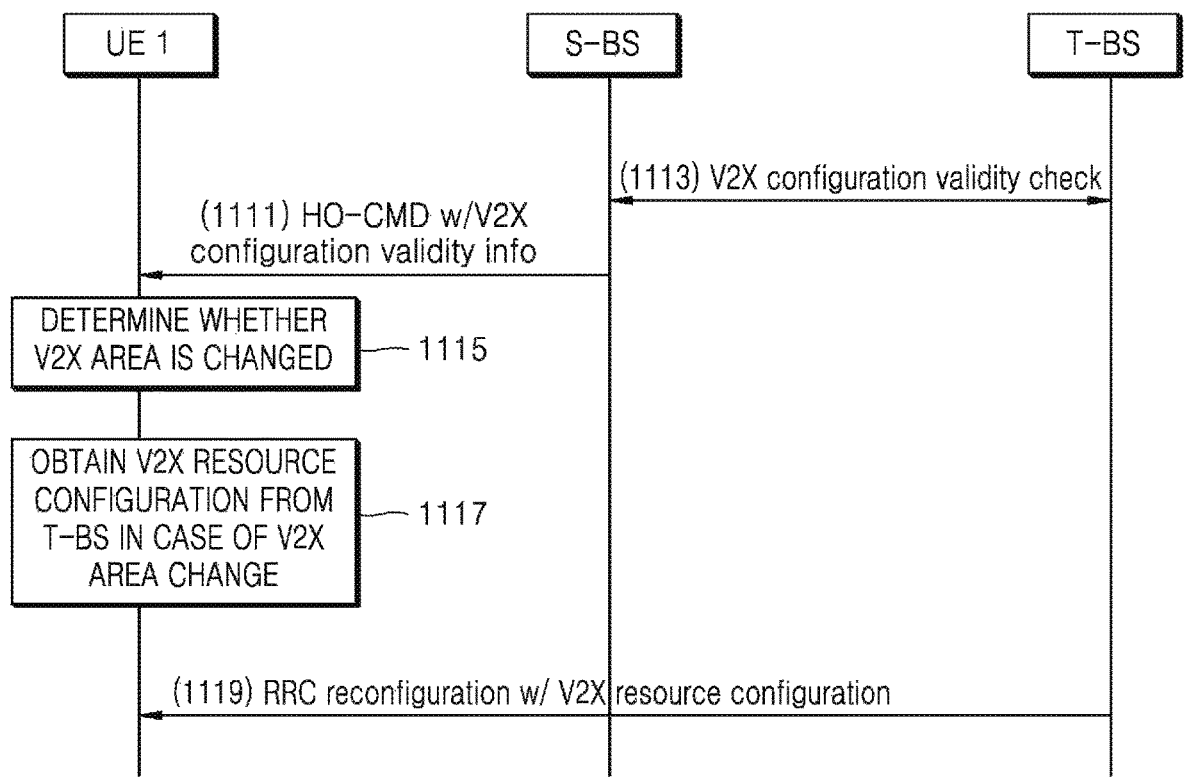
FIG. 11B illustrates another signal procedure for operating sidelink resource configuration information for direct communication between UEs, according to an embodiment of the disclosure.

FIG. 11B illustrates an example of a procedure for identifying validity of the V2X sidelink resource configuration information by the UE in the connected state.

Referring to FIG. 11B, in operation 1111, the UE may receive a parameter indicating validity of V2X sidelink resource configuration information being used in a serving cell through a HO-CMD message indicating a handover to a target cell. Identification of the validity of the V2X sidelink resource configuration information may use a signaling procedure between a serving cell and a target cell in operation 1113. In operation 1115, a parameter used to identify the validity of the V2X sidelink resource configuration information through the HO-CMD message may include a 1-bit V2X configuration validity indicator or a V2X configuration validity indication bitmap. When the V2X configuration validity indicator is set to 1, the UE may determine that the V2X sidelink resource configuration information being used in the serving cell is available to the target cell. The V2X configuration validity indication bitmap may be used to identify the validity of each of several V2X sidelink resource configuration parameters. When the V2X configuration validity indication bitmap is set to 1, the UE may determine that the V2X sidelink resource configuration parameter being used in the serving cell is available to the target cell. When the V2X configuration validity indicator or a bit value of the V2X configuration validity indication is set to 0, the UE may obtain again the V2X sidelink resource configuration information or resource configuration parameter from the target cell. The V2X sidelink resource configuration information or parameter determined to be invalid may be obtained through RRC dedicated signaling received from the target cell as in operations 1117 and 1119.

Figure 11C:
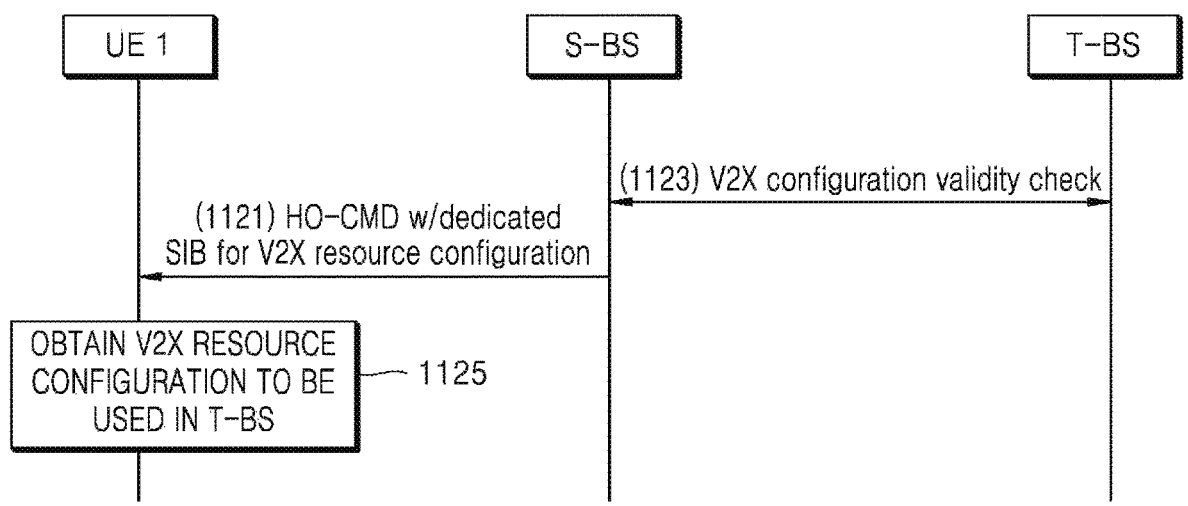
FIG. 11C illustrates another signal procedure for operating sidelink resource configuration information for direct communication between UEs, according to an embodiment of the disclosure.

FIG. 11C illustrates another example of a procedure for identifying validity of the V2X sidelink resource configuration information by the UE in the connected state.

Referring to FIG. 11C, in operation 1121, the UE may receive a parameter indicating validity of V2X sidelink resource configuration information being used in a serving cell through a HO-CMD message indicating a handover to a target cell. Identification of the validity of the V2X sidelink resource configuration information may use a signaling procedure between a serving cell and a target cell in operation 1123. In operation 1125, a parameter used by the UE to determine the validity of the V2X sidelink resource configuration information in the HO-CMD message may include dedicatedSIB.

According to an embodiment of the disclosure, dedicatedSIB parameter information included in the HO-CMD message may be as below.

dedicatedSIB1-Delivery OCTET STRING (CONTAINING SIB1) OPTIONAL, —Need N
dedicatedSystemInformationDelivery OCTET STRING (CONTAINING SystemInformation)

When dedicatedSIB sibTypeV2X is included in the HO-CMD message, the UE may use the V2X sidelink resource configuration information provided in sibTypeV2X in the target cell.

In another example of a parameter available for identifying the validity of the V2X sidelink resource configuration information, the HO-CMD message may include an area ID. Area ID information may be used to use different area IDs for a V2X configuration set or respective V2X configurations, and when the UE determines that an area ID for a V2X configuration set or each V2X configuration being used in the serving cell is changed in the target cell (i.e., the same area ID as in the serving cell is not set), the UE may obtain again V2X sidelink resource configuration information provided through RRC dedicated signaling from the target cell.

According to an embodiment of the disclosure, an IE notifying area ID information with a valid V2X configuration may be as below.

---

SL-V2X-UE-Config ::= SEQUENCE {
    areaIDList AreaIDList     OPTIONAL, --Need OR
    typeTxSync SL-TypeTxSync          OPTIONAL, --Need OR
    v2x-SyncConfig    SL-SyncConfigListNFreqV2X    OPTIONAL, --Need OR
    v2x-CommRxPool    SL-CommRxPoolListV2X         OPTIONAL, --Need OR
    v2x-CommTxPoolNormal  SL-CommTxPoolListV2X     OPTIONAL, --Need OR
    p2x-CommTxPoolNormal  SL-CommTxPoolListV2X     OPTIONAL, --Need OR
    v2x-CommTxPoolExceptional    SL-CommResourcePoolV2X OPTIONAL, --Need OR
    v2x-ResourceSelectionConfig  SL-CommTxPoolSensingConfig OPTIONAL, --Need OR

```
    zoneConfig  SL-ZoneConfig OPTIONAL, --Need-OR
    offsetDFN         INTEGER-(0..1000)-    OPTIONAL,  --Need-OR
    ...
}
```

Figure 11D:
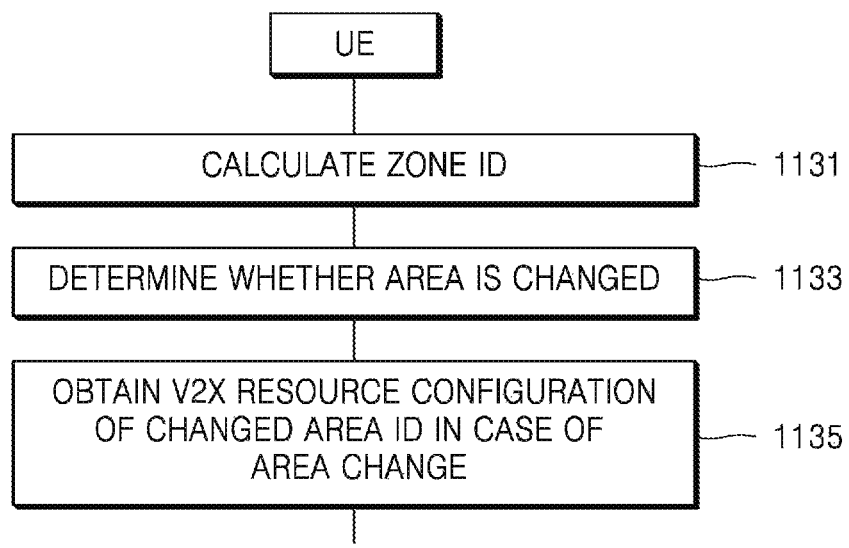
FIG. 11D illustrates another signal procedure for operating sidelink resource configuration information for direct communication between UEs, according to an embodiment of the disclosure.

FIG. 11D illustrates an example of a procedure for identifying validity of the V2X sidelink resource configuration information by the UE out of a coverage.

Referring to FIG. 11D, out of the coverage, the UE may perform V2X packet transmission/reception by using pre-configured V2X sidelink resource configuration information. An example of a scenario to identify the validity of the pre-configured V2X sidelink resource configuration information may be as below. The V2X service may be used at 5.9 GHz in an area A, and the V2X service may be used at 64 GHz in an area B. The V2X configuration of 5.9 GHz and the V2X configuration of 64 GHz may be configured differently. When the UE moves between zones corresponding to the area A, the 5.9 GHz V2X configuration corresponding to the area A may be maintained. When the UE moves between zones corresponding to the area B, the 64 GHz V2X configuration corresponding to the area B may be maintained.

Referring to FIG. 11D, in operation 1131, The UE may calculate a zone ID for a zone where the UE is currently located. The zone ID of the UE may be calculated as follows:

$$x1 = \text{Floor}(x/L) \text{Mod } Nx;$$

$$y1 = \text{Floor}(y/W) \text{Mod } Ny;$$

$$\text{Zone\_id} = y1 * Nx + x1.$$

In operation 1133, the UE may determine whether the zone ID is included in the area ID being used. The zone ID and area ID information mapped thereto may be provided through a pre-configured pre-configuration parameter. When the UE determines that the current zone ID is not included in the area ID being used, the UE may obtain and use a pre-configuration parameter corresponding to the changed area ID, in operation 1135.

According to an embodiment of the disclosure, pre-configured V2X sidelink resource configuration information and information indicating validity of the resource configuration information, i.e., a zone ID and area ID information mapped thereto may be as below.

An apparatus and method according to various embodiments of the disclosure may provide a method of supporting a vehicle communication service requiring various QoSs in a vehicle communication system by granting sidelink resources to be used for direct communication between UEs, thereby achieving required values for reliability and low-latency in vehicle communication.

In addition, effects obtainable in the disclosure are not limited to the effects as described above, and other effects not described above will become apparent to those skilled in the art from the following detailed description.

While the disclosure has been shown and described with reference to various embodiments thereof, it will be understood by those skilled in the art that various changes in form and details may be made therein without departing the spirit and scope of the disclosure as defined by the appended claims and their equivalents.

What is claimed is:

1. A method, performed by a user equipment (UE), of performing sidelink communication, the method comprising:
    receiving a system information block (SIB) including information for determining a validity of system information for sidelink communication from a base station, the information including an area scope parameter, a value tag, and a system information area identification (ID);
    obtaining a valid SIB for sidelink communication based on the information for determining a validity of system information for sidelink communication;
    identifying a validity area for information of a pool of sidelink resources included in the valid SIB for sidelink communication;
    autonomously determining a sidelink resource based on information of a pool of sidelink resources included in the valid SIB for sidelink communication within the identified validity area; and
    performing sidelink communication with another UE using the determined sidelink resource,
    wherein the UE is in an idle state or an inactive state, and

```
SL-V2X-PreconfigFreqInfo-::=      SEQUENCE-{
    v2x-CommPreconfigGeneral-         SL-PreconfigGeneral,
    v2x-CommPreconfigSync         SL-PreconfigV2X-Sync   OPTIONAL,
    v2x-CommRxPoolList            SL-PreconfigV2X-RxPoolList,
    v2x-CommTxPoolList            SL-PreconfigV2X-TxPoolList,
    p2x-CommTxPoolList            SL-PreconfigV2X-TxPoolList,
    v2x-ResourceSelectionConfig   -SL-CommTxPoolSensingConfig-
OPTIONAL,
    zoneConfig                    SL-ZoneConfig OPTIONAL,-
    v2x-AreaList                  SL-AreaList OPTIONAL,
    syncPriority                  ENUMERATED-{gnss,-gnb,-enb},
    thresSL-TxPrioritization      SL-Priority OPTIONAL,
    offsetDFN                     INTEGER-(0..1000)-OPTIONAL,
    ...
}
SL-AreaList-::=-SEQUENCE-]
    v2x-AreaID  SL-AreaID,
    ----v2x-ZoneIDList  SL-ZoneIDList,
}
``` wherein the obtaining of the valid SIB for sidelink communication comprises:
considering a stored SIB for sidelink communication as the valid SIB for sidelink communication in case that an area scope parameter for the stored SIB for sidelink communication is the same as the area scope parameter in the received SIB, and a system information area ID for the stored SIB for sidelink communication is identical to the system information area ID in the received SIB, and
receiving, from the base station, the valid SIB for sidelink communication, in case that the area scope parameter for the stored SIB for sidelink communication is not the same as the area scope parameter in the received SIB.

2. The method of claim 1, wherein the UE and the other UE are inside a coverage of a base station.

3. The method of claim 1, further comprising determining that the stored SIB for sidelink communication is invalid in case that the area scope parameter for the stored SIB for sidelink communication is not the same as the area scope parameter in the received SIB.

4. The method of claim 1, further comprising:
receiving information of a pool of sidelink resources from a base station by radio resource control (RRC) dedicated signaling; and
autonomously determining the sidelink resource based on the information of the pool of the sidelink resources received by the RRC dedicated signaling.

5. The method of claim 1, further comprising autonomously determining the sidelink resource based on information of a preconfigured pool of sidelink resources.

6. A user equipment (UE) for performing sidelink communication, the UE comprising:
a transceiver; and
at least one processor coupled with the transceiver and configured to:
receive a system information block (SIB) including information for determining a validity of system information for sidelink communication from a base station, the information including an area scope parameter, a value tag, and a system information area identification (ID),
obtain a valid SIB for sidelink communication based on the information for determining a validity of system information for sidelink communication,
identify a validity area for information of a pool of sidelink resources included in the valid SIB for sidelink communication,
autonomously determine a sidelink resource based on information of a pool of sidelink resources included in the valid SIB for sidelink communication within the identified validity area, and
perform sidelink communication with another UE using the determined sidelink resource,
wherein the at least one processor is further configured to:
consider a stored SIB for sidelink communication as the valid SIB for sidelink communication in case that an area scope parameter for the stored SIB for sidelink communication is the same as the area scope parameter in the received SIB, and a system information area ID for the stored SIB for sidelink communication is identical to the system information area ID in the received SIB, and
receive, from the base station, the valid SIB for sidelink communication, in case that the area scope parameter for the stored SIB for sidelink communication is not the same as the area scope parameter in the received SIB.

7. The UE of claim 6, wherein the UE and the other UE are inside a coverage of a base station.

8. The UE of claim 6, wherein the at least one processor is further configured to determine that the stored SIB for sidelink communication is invalid in case that the area scope parameter for the stored SIB for sidelink communication is not the same as the area scope parameter in the received SIB.

9. The UE of claim 6, wherein the at least one processor is further configured to:
receive information of a pool of sidelink resources from a base station by radio resource control (RRC) dedicated signaling, and
autonomously determine the sidelink resource based on the information of the pool of the sidelink resources received by the RRC dedicated signaling.

10. The UE of claim 6, wherein the at least one processor is further configured to autonomously determine the sidelink resource based on information of a preconfigured pool of sidelink resources.

* * * * *